(12) United States Patent
Aoki et al.

(10) Patent No.: US 10,972,716 B2
(45) Date of Patent: Apr. 6, 2021

(54) CALIBRATION METHOD AND MEASUREMENT TOOL

(71) Applicants: Shin Aoki, Kanagawa (JP); Naoki Kikuchi, Kanagawa (JP); Kagehiro Nagao, Kanagawa (JP); Jun Kishiwada, Kanagawa (JP)

(72) Inventors: Shin Aoki, Kanagawa (JP); Naoki Kikuchi, Kanagawa (JP); Kagehiro Nagao, Kanagawa (JP); Jun Kishiwada, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/296,562

(22) Filed: Mar. 8, 2019

(65) Prior Publication Data

US 2019/0208182 A1 Jul. 4, 2019

Related U.S. Application Data

(63) Continuation of application No. 15/114,007, filed as application No. PCT/JP2015/053024 on Jan. 28, 2015, now Pat. No. 10,277,887.

(30) Foreign Application Priority Data

Jan. 28, 2014 (JP) ................. 2014-013520
May 30, 2014 (JP) ................. 2014-112737
Nov. 27, 2014 (JP) ................. 2014-240206

(51) Int. Cl.
*H04N 13/246* (2018.01)
*G06T 7/80* (2017.01)
(Continued)

(52) U.S. Cl.
CPC .......... *H04N 13/246* (2018.05); *B60R 11/04* (2013.01); *G06T 7/521* (2017.01); *G06T 7/70* (2017.01);
(Continued)

(58) Field of Classification Search
CPC .... H04N 13/246; H04N 13/239; G06T 7/521; G06T 7/85; G06T 7/70; B60R 11/04
(Continued)

(56) References Cited

U.S. PATENT DOCUMENTS 6,396,397 B1    5/2002  Bos et al.
6,498,972 B1 *  12/2002 Rao .................... B60Q 1/38
                                              701/301
(Continued)

FOREIGN PATENT DOCUMENTS

CN    201322616 Y    10/2009
CN    202304820 U     7/2012
(Continued)

OTHER PUBLICATIONS

International Search Report dated May 12, 2015 in PCT/JP2015/053024 filed on Jan. 28, 2015.
(Continued)

*Primary Examiner* — Nguyen T Truong
(74) *Attorney, Agent, or Firm* — Oblon, McClelland, Maier & Neustadt, L.L.P.

(57) ABSTRACT

A calibration method calibrates a stereo camera. The calibration method includes: measuring a relative position between the stereo camera and an object that is placed so as to fall within an image capturing area of the stereo camera; acquiring a captured image that is captured by the stereo camera and includes the object; and determining a calibration parameter for calibrating the stereo camera based on the relative position and the captured image.

10 Claims, 22 Drawing Sheets

(51) Int. Cl.
  *G06T 7/70* (2017.01)
  *G06T 7/521* (2017.01)
  *H04N 13/239* (2018.01)
  *B60R 11/04* (2006.01)
  *B60R 11/00* (2006.01)

(52) U.S. Cl.
  CPC ............ *G06T 7/85* (2017.01); *H04N 13/239* (2018.05); *B60R 2011/0026* (2013.01); *G06T 2207/10012* (2013.01); *G06T 2207/10021* (2013.01); *G06T 2207/10028* (2013.01); *G06T 2207/30208* (2013.01); *G06T 2207/30252* (2013.01)

(58) Field of Classification Search
  USPC .......................................................... 348/47
  See application file for complete search history.

(56) References Cited

U.S. PATENT DOCUMENTS

| | | |
|---|---|---|
| 2010/0283837 A1 | 11/2010 | Oohchida et al. |
| 2012/0180564 A1 | 7/2012 | Ohtomo et al. |
| 2012/0233841 A1* | 9/2012 | Stein ................. G03B 17/02 29/428 |
| 2013/0250065 A1 | 9/2013 | Aoki et al. |
| 2013/0278755 A1* | 10/2013 | Starns .................... G01C 11/02 348/135 |
| 2014/0111647 A1* | 4/2014 | Atsmon ................ H04N 7/185 348/148 |
| 2015/0109419 A1* | 4/2015 | Vollrath .................... G01C 3/08 348/47 |

FOREIGN PATENT DOCUMENTS

| | | |
|---|---|---|
| EP | 2 141 450 A1 | 1/2010 |
| JP | H09113356 | 5/1997 |
| JP | 4109077 | 4/2008 |
| JP | 2011-112401 | 6/2011 |
| JP | 2012-058045 | 3/2012 |
| JP | 2012-149921 A | 8/2012 |
| JP | 2012-167944 | 9/2012 |
| JP | 2014-006179 | 1/2014 |
| JP | 2014-174088 | 9/2014 |

OTHER PUBLICATIONS

Partial Supplementary European Search Report dated Jan. 3, 2017 in patent application No. 15743958.9.
Carlo Dal Mutto et al., "Calibration" Time-of-Flight Cameras and Microsoft Kinect™, Chapter 4, 2012, XP055329861, pp. 48-68.
Combined Office Action and Search Report dated Nov. 16, 2017 in Chinese Patent Application No. 201580005397.6 (with English language translation), 17 pages.

* cited by examiner

CALIBRATION METHOD AND MEASUREMENT TOOL

This application is a continuation application of U.S. application Ser. No. 15/114,007, filed Jul. 25, 2016, which is a National Stage application of PCT/JP2015/053024, filed Jan. 28, 2015, and claims priority to Japanese Priority Application No. 2014-240206, filed Nov. 27, 2014, and Japanese Priority Application No. 2014-112737, filed May 30, 2014, and Japanese Priority Application No. 2014-013520, filed Jan. 28, 2014. The entire contents of the above-identified applications are incorporated herein by reference.

TECHNICAL FIELD

The present invention relates to a calibration method and a measurement tool.

BACKGROUND ART

Stereo cameras capable of measuring the distance to an object are used. For example, a technology has been put into practical use to control a car by measuring the distance to an object in front of the car by using a stereo camera (hereafter, referred to as a "car-mounted stereo camera") that is mounted on a car. For example, the distance that is measured by a car-mounted stereo camera is used for giving an alarm to a driver or controlling a brake, steering, and/or the like, for the purpose of prevention of car collision, a control on a distance between cars, and/or the like.

Generally, car-mounted stereo cameras are often installed inside the front windshield of cars. This is because, if a car-mounted stereo camera is installed outside the car, it needs to have a higher durability in terms of waterproof, dust prevention, and the like. If a stereo camera is installed inside the car, it captures an image of the landscape outside the car through the front windshield. Generally, the front windshield has a complicated curved shape, and it has a distorted shape compared to optical components such as a lens inside the camera. Therefore, the front windshield causes the captured image that is captured through the front windshield to be distorted. Furthermore, depending on the installation position and the installation direction when installing a stereo camera in the car, the characteristics of a distortion of captured images are changed. To calibrate such a distortion that is included in the captured image, it is necessary to calculate a calibration parameter for calibrating (correcting) a distortion of the captured image by installing a stereo camera in a predetermined position of the vehicle and then using the captured image that is captured through the front windshield in that state.

A generally known method for calculating a calibration parameter for calibrating a distortion of a captured image is a method that uses a chart in which a specific mark, or the like, for measuring a distance is described. With this method, a calibration parameter for calibrating a distortion of the captured image is calculated on the basis of the difference between the position of a mark (object) that is on the captured image and that is calculated in theory on the basis of the relative position between the mark and the stereo camera and the position of the mark on the captured image that is obtained when an image of the mark is actually captured by the stereo camera. That is, a calibration parameter is calculated, which determines a conversion so as to eliminate the difference.

Patent Literature 1 discloses a device that converts each of a pair of image data sets output from a pair of cameras that is included in a stereo camera by using a calibration parameter that is based on the difference in the coordinates between one set of the image data and the other set of the image data so as to adjust an optical distortion and a positional deviation of the stereo camera by image processing.

However, if there is an error in the relative position between the stereo camera and the chart, an error occurs in the coordinates of the object that is in the captured image and that is calculated in theory; therefore, an error also occurs in a calibration parameter for calibrating a distortion of the captured image. Particularly, there is a problem in that an error easily occurs in the relative position between the chart and the stereo camera that is installed in an object, such as a vehicle.

In consideration of the foregoing, there is a need to provide a calibration method and a measurement tool that make it possible to calculate a high-accuracy calibration parameter for calibrating a stereo camera.

SUMMARY OF THE INVENTION

A calibration method calibrates a stereo camera. The calibration method includes: measuring a relative position between the stereo camera and an object that is placed so as to fall within an image capturing area of the stereo camera; acquiring a captured image that is captured by the stereo camera and includes the object; and determining a calibration parameter for calibrating the stereo camera based on the relative position and the captured image.

A calibration method calibrates a stereo camera by using a measurement tool that includes a first member having a surface that includes a chart that is used to calibrate the stereo camera, a light source that is installed on the surface and that emits light with a uniform intensity regardless of a position on the surface, and a second member that covers the light source and emits the light through a plurality of holes. The calibration method includes: acquiring a captured image that is captured by the stereo camera and includes the measurement tool as an object; measuring a deviation of a direction of the measurement tool from a facing position of the stereo camera based on a position of maximum brightness in the captured image; and determining a calibration parameter for calibrating the stereo camera based on the deviation of the direction of the measurement tool and the captured image.

A measurement tool includes: a first member that has a surface that includes a chart that is used to calibrate the stereo camera; a light source that is installed on the surface and that emits light with a uniform intensity regardless of a position on the surface; and a second member that covers the light source and emits the light through a plurality of holes.

DESCRIPTION OF EMBODIMENTS

A detailed explanation is given below, with reference to the attached drawings, of an embodiment of a calibration method and a measurement tool.

First Embodiment

Figure 1:
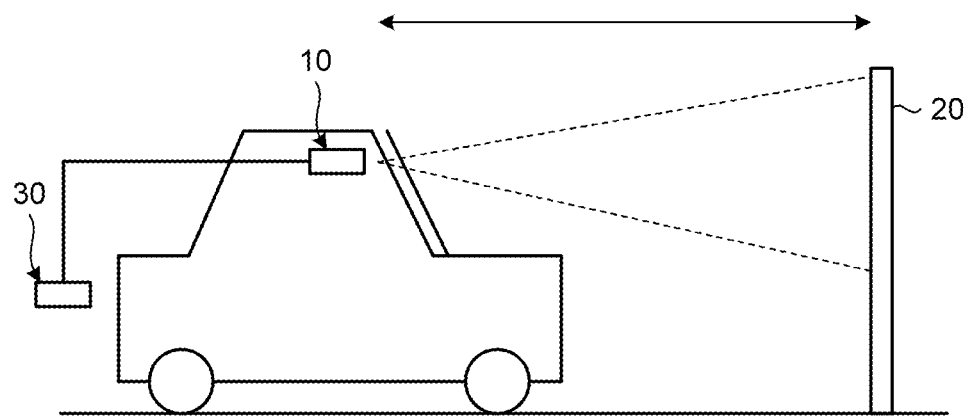
FIG. 1 is a diagram that illustrates an example of the relationship among a measurement tool, a stereo camera, and a calibration device according to a first embodiment.

FIG. 1 is a diagram that illustrates an example of the relationship among a measurement tool 20, a stereo camera 10, and a calibration device 30 according to a first embodiment. FIG. 1 is an example of the case of a calibration of a captured image that is captured by the stereo camera 10 (car-mounted stereo camera) that is installed inside the front windshield of a car. The measurement tool 20 is installed such that it falls within the image capturing area of the stereo camera 10. For example, the measurement tool 20 is installed at a distance of about 2 m from the stereo camera 10 such that they almost face each other. The measurement tool 20 is used to acquire measurement data for determining a calibration parameter to calibrate the stereo camera 10. Measurement data is input to a computer that is the calibration device 30, and a calibration parameter is determined by the computer. First, an explanation is given of the stereo camera 10 that is the target to be calibrated.

Figure 2:
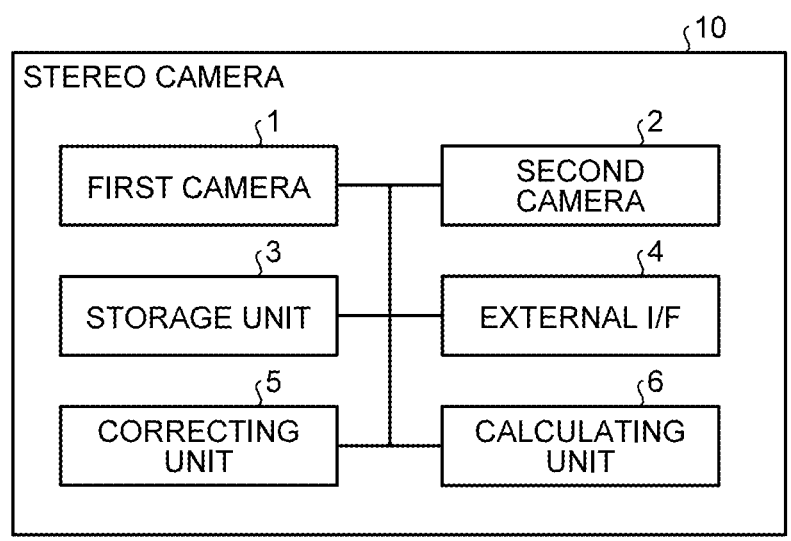
FIG. 2 is a diagram that illustrates an example of the configuration of the stereo camera according to the first embodiment.

FIG. 2 is a diagram that illustrates an example of the configuration of the stereo camera 10 according to the first embodiment. The stereo camera 10 according to the present embodiment includes a first camera 1, a second camera 2, a storage unit 3, an external I/F 4, a correcting unit 5, and a calculating unit 6. The first camera 1 captures an image of the object so as to acquire a first captured image. The second camera 2 captures an image of the object so as to acquire a second captured image. The first camera 1 and the second camera 2 are arranged in parallel so that their optical axes are parallel to each other. The image capturing timings of the first camera 1 and the second camera 2 are synchronized, and they simultaneously capture an image of the same object.

The storage unit 3 stores the first captured image, the second captured image, and a calibration parameter. A calibration parameter is a parameter that is used for correcting a distortion of the first captured image and the second captured image. A calibration parameter is determined by using a calibration method according to the present embodiment. The external I/F 4 is an interface for inputting and outputting data of the storage unit 3. A calibration parameter that is used by the stereo camera 10 is determined by using the calibration method according to the present embodiment, and it is stored in the storage unit 3 by using the external I/F 4.

The correcting unit 5 reads, from the storage unit 3, the first captured image, the second captured image, and the calibration parameter. The correcting unit 5 corrects the first captured image and the second captured image by using an image correction equation that corresponds to the calibration parameter. The image correction equation is the equation for correcting the first captured image (the second captured image) by converting the coordinates of the first captured image (the second captured image). For example, in the case where the coordinates of the first captured image (the second captured image) are corrected by an affine transformation, as the image correction equation can be represented by using a matrix, a calibration parameter is components of the matrix. Furthermore, if the coordinates of the first captured image (the second captured image) are corrected by a non-linear transformation, a calibration parameter is coefficients of a polynomial, or the like, that represents the conversion. Moreover, the correcting unit 5 may correct any one of the first captured image and the second captured image. Specifically, the image correction equation may be an image correction equation for correcting any one of the captured images by using the other one of the captured images as a reference. The correcting unit 5 inputs the corrected first captured image and the corrected second captured image to the calculating unit 6.

The calculating unit 6 calculates a parallax of each object from the corrected first captured image and the corrected second captured image. Here, an explanation is given of the parallax and the distance measurement principle that uses the parallax.

Figure 3:
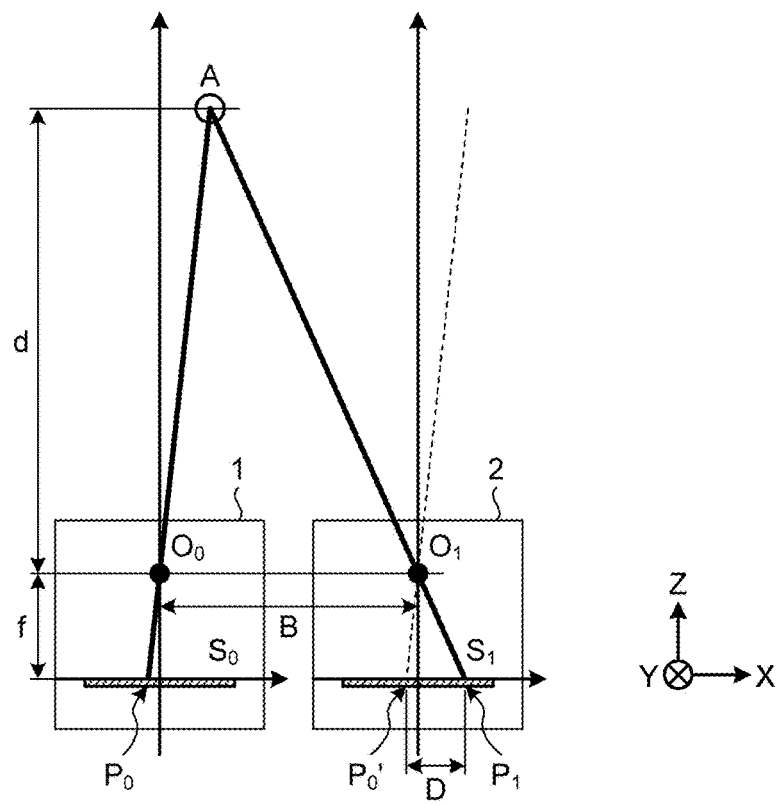
FIG. 3 is a diagram that illustrates a distance measurement principle that uses the stereo camera.

FIG. 3 is a diagram that illustrates the distance measurement principle that uses the stereo camera 10. In the example of FIG. 3, the first camera 1 (a focal length f, an optical center $O_0$, and an image capturing surface $S_0$) is installed such that the Z axis is in the direction of the optical axis. Furthermore, the second camera 2 (the focal length f, an optical center $O_1$, and an image capturing surface $S_1$) is installed such that the Z axis is in the direction of the optical axis. The first camera 1 and the second camera 2 are arranged parallel to the X axis at positions apart from each other by a distance B (base length). Hereafter, the coordinate system of FIG. 3 is referred to as the "camera coordinate system". Furthermore, the coordinate system where the optical center of the first camera 1 is a reference is referred to as the "first-camera coordinate system". Moreover, the coordinate system where the optical center of the second camera 2 is a reference is referred to as the "second-camera coordinate system".

An image of an object A, which is located at a position away from the optical center $O_0$ of the first camera 1 by a distance d in the direction of the optical axis, is formed on $P_0$ that is the intersection point between a straight line A-$O_0$ and the image capturing surface $S_0$. Furthermore, with the second camera 2, an image of the same object A is formed on a position $P_1$ on the image capturing surface $S_1$.

Here, $P_0'$ is the intersection point between the image capturing surface $S_1$ and the straight line that passes through the optical center $O_1$ of the second camera 2 and that is parallel to the straight line A-$O_0$. Furthermore, D is the distance between $P_0'$ and $P_1$. The distance D represents the degree of positional deviation (parallax) on the images when images of the same object are taken by two cameras. A triangle A-$O_0$-$O_1$ and a triangle $O_1$-$P_0'$-$P_1$ are similar. Therefore, the following Equation (1) is provided.

$$d = \frac{Bf}{D} \quad (1)$$

Specifically, the distance d to the object A can be determined from the base length B, the focal length f, and the parallax D. Furthermore, if the first camera 1 and the second camera 2 are accurately positioned, the distance d (the distance between the optical center $O_0$ of the first camera 1 and the object A in the direction of the optical axis) that is calculated by using the first-camera coordinate system is the same as the distance d (the distance between the optical center $O_1$ of the second camera 2 and the object A in the direction of the optical axis) that is calculated by using the second-camera coordinate system.

The foregoing is the distance measurement principle by the stereo camera 10. To obtain the distance d to the object A with accuracy, the first camera 1 and the second camera 2 need to be accurately positioned. However, there is a possibility that the first camera 1 (the second camera 2) is displaced in such a direction that it rotates around the X axis, the Y axis, or the Z axis. This causes the coordinates of the first captured image (the second captured image) to be displaced substantially in an upward, downward, leftward, or rightward direction. Furthermore, in the case of a car-mounted stereo camera that captures an image of the object through the front windshield, a distortion occurs in the first captured image (the second captured image) due to an effect of the front windshield. The stereo camera 10 corrects the first captured image (the second captured image) by signal processing using a calibration parameter for correcting an error of a parallax that is caused by a displacement of the first captured image (the second captured image) due to an assembly tolerance of two cameras and by a distortion of the first captured image (the second captured image) due to the front windshield.

Returning to FIG. 2, the calculating unit 6 generates a parallax image that represents a parallax on a pixel by pixel basis by using the density value of a pixel of the captured image (the first captured image or the second captured image) that is used as a reference to calculate the parallax. Furthermore, the calculating unit 6 calculates the distance to the object by using the parallax image and Equation (1).

Figure 4:
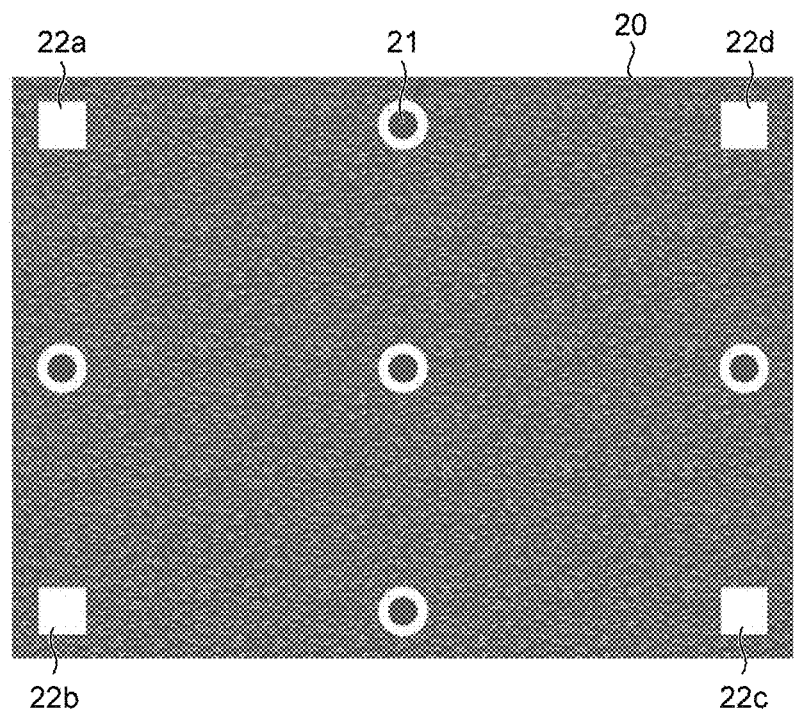
FIG. 4 is a diagram that illustrates an example of the measurement tool according to the first embodiment.

Next, an explanation is given of the measurement tool 20. FIG. 4 is a diagram that illustrates an example of the measurement tool 20 according to the first embodiment. The measurement tool 20 according to the present embodiment has a structure like a square plate. Furthermore, the shape and the material of the measurement tool 20 may be optional. Specifically, the measurement tool 20 may be any member that has an area for acquiring data that is used for a calibration. The surface of the measurement tool 20 includes five marks 21. The mark 21 is used as a measurement chart to calculate a parallax. Furthermore, the shape, the number, and the position of the marks 21 are not limited to the configuration according to the present embodiment and may be optional. Furthermore, the surface of the measurement tool 20 has a shading pattern that makes it easier to detect a corresponding point that is in the second captured image and that corresponds to a point in the first captured image. Moreover, a distance measurement device 22a, a distance measurement device 22b, a distance measurement device 22c, and a distance measurement device 22d are provided on the four corners of the measurement tool 20 like a square plate. Hereafter, the distance measurement device 22a, the distance measurement device 22b, the distance measurement device 22c, and the distance measurement device 22d are simply referred to as the distance measurement device 22 if they are not to be discriminated from one another.

Figure 5:
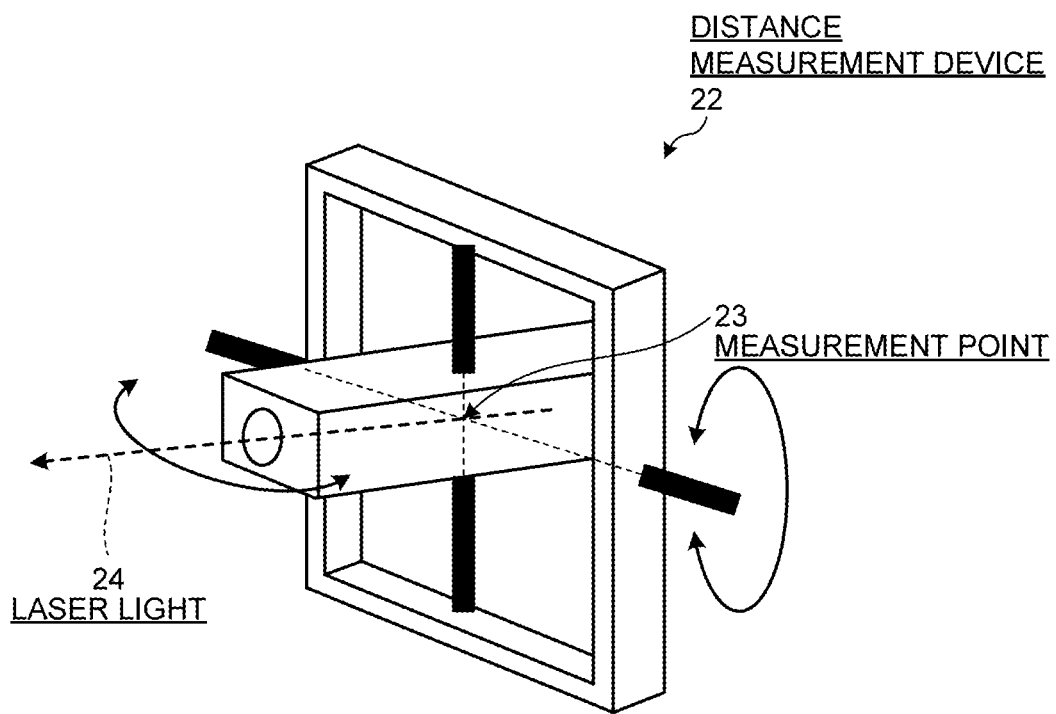
FIG. 5 is a diagram that illustrates an example of a distance measurement device according to the first embodiment.

FIG. 5 is a diagram that illustrates an example of the distance measurement device 22 according to the first embodiment. The distance measurement device 22 has a biaxially rotatable holding mechanism that is rotatable in upward, downward, leftward, and rightward directions around a measurement point 23 that is previously set. The distance measurement device 22 according to the present embodiment measures a distance by using TOF (Time of Flight) of laser light 24. Furthermore, a distance measurement method of the distance measurement device 22 may be optional. For example, the distance measurement device 22 may measure a distance by using ultrasonic waves.

The distance measurement device 22 acquires the distance information (hereafter, referred to as the "first distance information") that indicates the distance to the optical center $O_0$ (see FIG. 3) of the first camera 1 and the distance information (hereafter, referred to as the "second distance information") that indicates the distance to the optical center $O_1$ (see FIG. 3) of the second camera 2. Furthermore, in FIG. 4, the reason why the distance measurement devices 22 are provided on the four corners of the measurement tool 20 is that the measurement points 23 of FIG. 5 are located as far as possible from one another. Thus, it is possible to obtain multiple pieces of first distance information (second distance information) that have values as different as possible, and it is possible to improve the accuracy with which the calibration device 30, which is described below, calculates the distance between the first camera 1 (the second camera 2) and the measurement tool 20 (the distance in the direction of the optical axis of the first camera 1 or the distance in the direction of the optical axis of the second camera 2). Furthermore, the number and the position of the distance measurement devices 22 are not limited to the configuration according to the present embodiment and may be optional.

Figure 6:
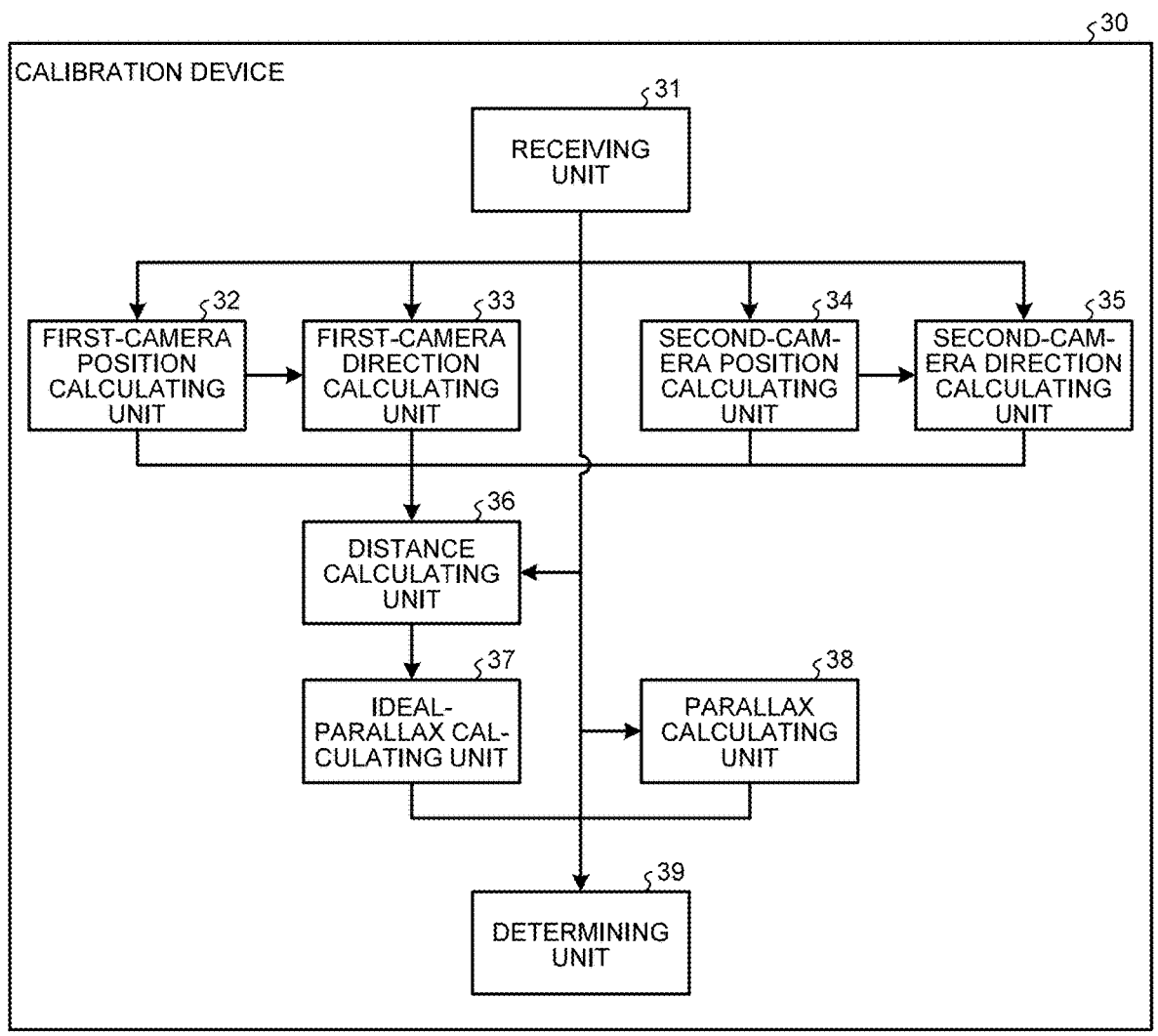
FIG. 6 is a diagram that illustrates an example of the configuration of the calibration device according to the first embodiment.

FIG. 6 is a diagram that illustrates an example of the configuration of the calibration device 30 according to the first embodiment. The calibration device 30 according to the present embodiment includes a receiving unit 31, a first-camera position calculating unit 32, a first-camera direction calculating unit 33, a second-camera position calculating unit 34, a second-camera direction calculating unit 35, a distance calculating unit 36, an ideal-parallax calculating unit 37, a parallax calculating unit 38, and a determining unit 39. The calibration device 30 is an information processing apparatus (computer).

The receiving unit 31 receives multiple (four in the present embodiment) pieces of first distance information, multiple (four in the present embodiment) pieces of second distance information, the first captured image that includes the measurement tool 20 as an object, the second captured image that includes the measurement tool 20 as an object, the three-dimensional coordinate information on the multiple (five in the present embodiment) marks 21 in the object coordinate system, and the three-dimensional coordinate information on the distance measurement device 22 (the measurement point 23) in the object coordinate system. For example, in accordance with a user's operation on the calibration device 30, the receiving unit 31 receives an input that indicates the multiple pieces of first distance information, the first captured image, the second captured image, the three-dimensional coordinate information on the marks 21, and the three-dimensional coordinate information on the distance measurement device 22. Here, an explanation is given of the object coordinate system.

Figure 7:
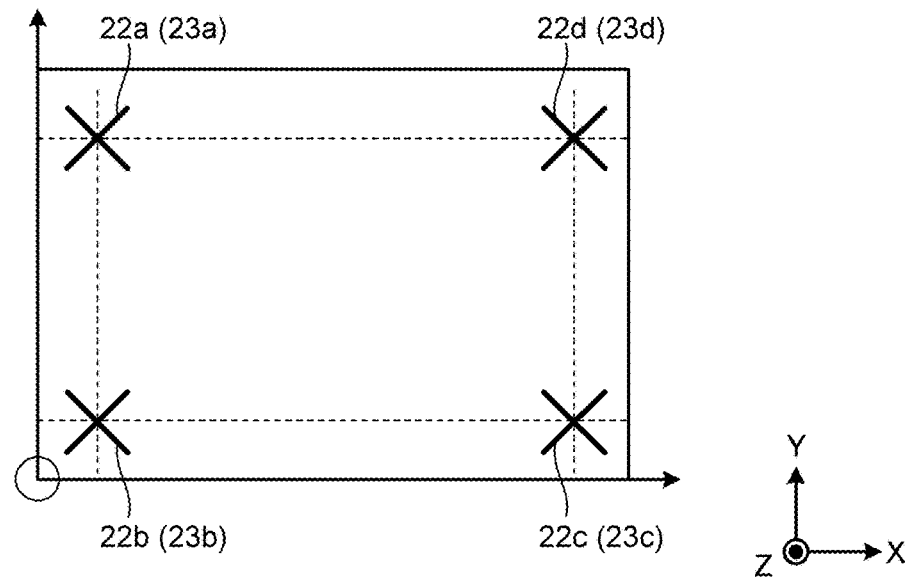
FIG. 7 is a diagram that illustrates an example of an object coordinate system according to the first embodiment.

FIG. 7 is a diagram that illustrates an example of the object coordinate system according to the first embodiment. FIG. 7 is an example of the case where the origin of the three-dimensional coordinates is located on the extreme lower left of the measurement tool 20. It is possible to accurately obtain the four three-dimensional coordinates that indicate the positions of the distance measurement device 22a (the measurement point 23a), the distance measurement device 22b (the measurement point 23b), the distance measurement device 22c (the measurement point 23c), and the distance measurement device 22d (the measurement point 23d) in the object coordinate system. That is, the four three-dimensional coordinates in the object coordinate system are already known. Furthermore, the three-dimensional coordinate information on the multiple (five in the present embodiment) marks 21 in the object coordinate system is also already known.

Returning to FIG. 6, the receiving unit 31 inputs, to the distance calculating unit 36, the three-dimensional coordinate information on the multiple (five in the present embodiment) marks 21 in the object coordinate system. The receiving unit 31 inputs the first captured image and the second captured image to the parallax calculating unit 38.

Furthermore, the receiving unit 31 inputs, to the first-camera position calculating unit 32, the first distance information and the three-dimensional coordinate information on the distance measurement device 22 (the measurement point 23) in the object coordinate system. Moreover, the receiving unit 31 inputs, to the second-camera position calculating unit 34, the second distance information and the three-dimensional coordinate information on the distance measurement device 22 (the measurement point 23) in the object coordinate system.

Furthermore, the receiving unit 31 inputs, to the first-camera direction calculating unit 33, the first captured image and the three-dimensional coordinate information on the distance measurement device 22 (the measurement point 23) in the object coordinate system. Furthermore, the receiving unit 31 inputs, to the second-camera direction calculating unit 35, the second captured image and the three-dimensional coordinate information on the distance measurement device 22 (the measurement point 23) in the object coordinate system.

On the basis of the multiple (four in the present embodiment) pieces of first distance information and the three-dimensional coordinate information on the distance measurement device 22 (the measurement point 23) in the object coordinate system, the first-camera position calculating unit 32 calculates the three-dimensional coordinates (hereafter, referred to as the "first camera coordinates") that indicate the position of the optical center $O_0$ of the first camera 1 by using the object coordinate system.

Figure 8:
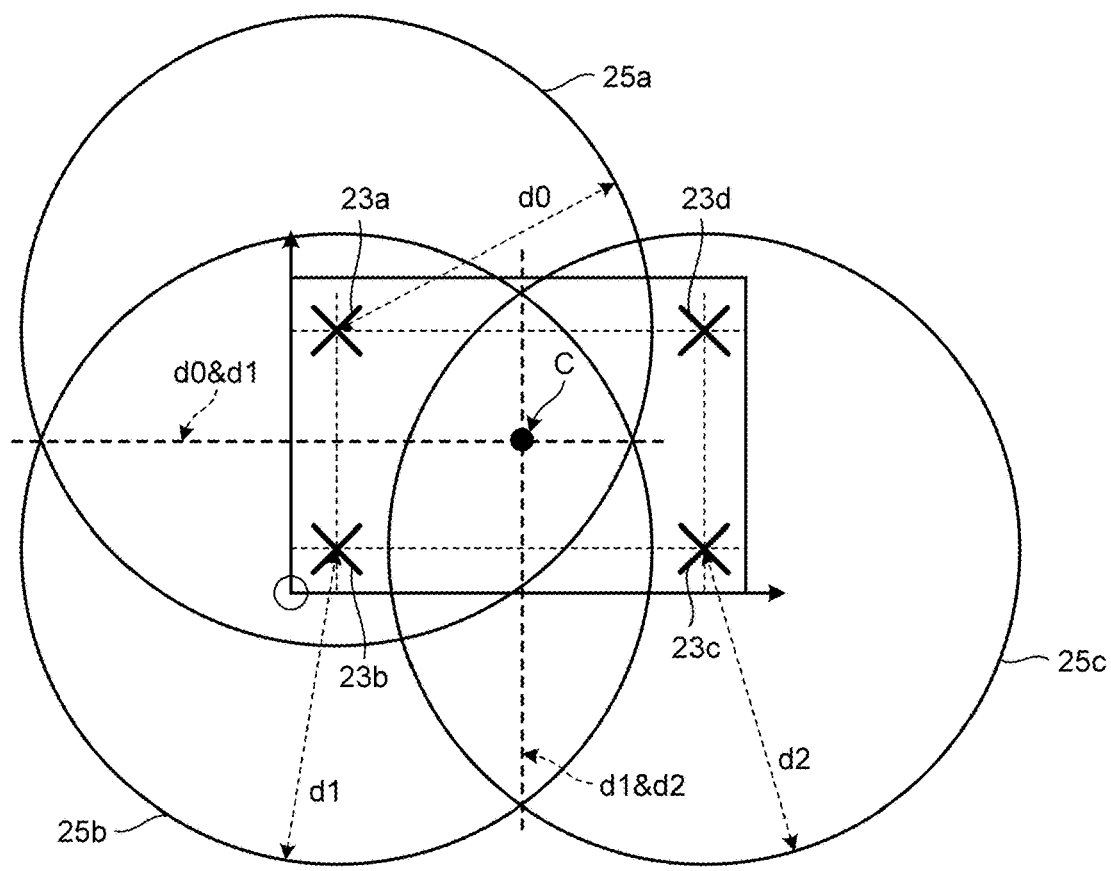
FIG. 8 is a diagram that illustrates an example of a method for determining the three-dimensional coordinates that indicate the position of a first camera according to the first embodiment.

FIG. 8 is a diagram that illustrates an example of the method for determining the three-dimensional coordinates that indicate the position of the first camera 1 according to the first embodiment. The first distance information that is acquired by the distance measurement device 22a is denoted by d0. That is, it denotes the distance from the measurement point 23a to the first camera 1. The first distance information that is acquired by the distance measurement device 22b is denoted by d1. That is, it denotes the distance from the measurement point 23b to the first camera 1. The first distance information that is acquired by the distance measurement device 22c is denoted by d2. That is, it denotes the distance from the measurement point 23c to the first camera 1.

The three-dimensional coordinates that indicate the position of the first camera 1 can be calculated by using the object coordinate system in theory as described below. First, the measurement point 23a is set as a center, and a point set 25a that represents a sphere with a radius d0 is determined. Next, the measurement point 23b is set as a center, and a point set 25b that represents a sphere with a radius d1 is determined. Then, the measurement point 23c is set as a center, and a point set 25c that represents a sphere with a radius d2 is determined. Then, the point set that is included in both the point set 25a and the point set 25b is determined. This point set is d0&d1 of FIG. 8. d0&d1 is the point set (circular arc) that is represented by using the intersection point between the point set that represents the sphere with the radius d0 and the point set that represents the sphere with the radius d1. Then, the point set that is included in both the point set 25b and the point set 25c is determined. This point set is d1&d2 of FIG. 8. d1&d2 is the point set (circular arc) that is represented by using the intersection point between the point set that represents the sphere with the radius d1 and the point set that represents the sphere with the radius d2. Finally, an intersection point C between the circular arc that is represented by d0&d1 of FIG. 8 and the circular arc that is represented by d1&d2 is determined, whereby the first camera coordinates can be calculated. That is, in theory, the first camera coordinates can be calculated if there are three pieces of first distance information.

However, in consideration of a measurement error of the distance measurement device 22, it is preferable to calculate the first camera coordinates by using the more measurement points 23 (four in the present embodiment). Therefore, the first-camera position calculating unit 32 calculates the intersection point C by performing a least squares approximation using, for example, the following Equation (2), thereby calculating the first camera coordinates.

$$E_1(p) = \sum_{i=1}^{n} (|pi - p| - di)^2 \qquad (2)$$

Here, n is the number of the measurement points 23. pi is the three-dimensional coordinates of the i-th measurement point 23. di is the distance from the i-th measurement point 23 to the first camera 1, which is measured by the distance measurement device 22.

Returning to FIG. 6, the first-camera position calculating unit 32 inputs, to the first-camera direction calculating unit 33, the first camera coordinates that are calculated by using the object coordinate system. Furthermore, the first-camera position calculating unit 32 inputs, to the distance calculating unit 36, the first camera coordinates that are calculated by using the object coordinate system.

The first-camera direction calculating unit 33 receives, from the receiving unit 31, the first captured image and the three-dimensional coordinate information on the distance measurement device 22 (the measurement point 23) in the object coordinate system. Furthermore, the first-camera direction calculating unit 33 receives, from the first-camera position calculating unit 32, the first camera coordinates that are calculated by using the object coordinate system.

The first-camera direction calculating unit 33 uses the camera coordinate system to calculate the direction (the direction of the optical axis) of the first camera 1 on the basis of the three-dimensional coordinates of the measurement point 23 (23a, 23b, 23c, 23d), the two-dimensional coordinates of the image of the measurement point 23 (23a, 23b, 23c, 23d) in the first captured image, and the focal length of the first camera 1. Specifically, the first-camera direction calculating unit 33 first converts the three-dimensional coordinates of the measurement point 23 that is calculated by using the object coordinate system into the camera coordinate system where its origin is the optical center $O_0$ of the first camera 1. Specifically, this camera coordinate system is the coordinates where, in a pinhole camera model, the position of a pinhole is the origin. Furthermore, at this time, the camera coordinate system does not still conform to the direction of the camera coordinate system that is caused due to a deviation of the direction of the first camera. Next, the first-camera direction calculating unit 33 calculates the triaxial rotation angle r=(α1, β1, γ1) to make the camera coordinate system conform to the direction of the camera coordinate system that is caused due to a deviation of the direction of the first camera.

Figure 9:
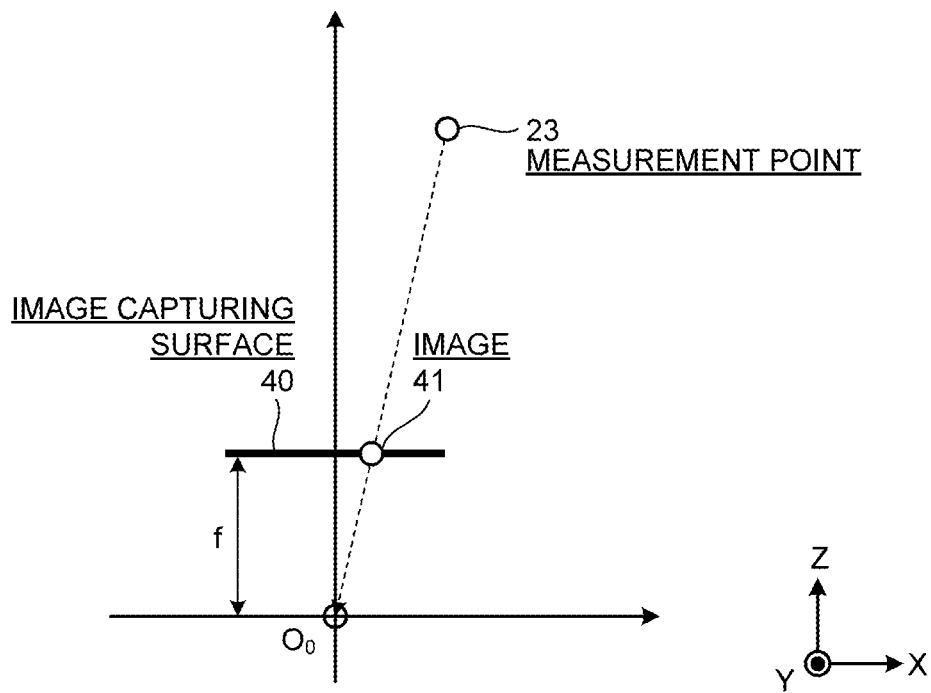
FIG. 9 is a diagram that illustrates an example of a camera coordinate system of the first camera according to the first embodiment.

FIG. 9 is a diagram that illustrates an example of the camera coordinate system of the first camera 1 according to the first embodiment. The three-dimensional coordinates of the measurement point 23 (object) are (x, y, z), the two-dimensional coordinates on an image capturing surface 40 are (u, v), and the focal length of the first camera 1 is f. Here, the position of an image 41 of the measurement point 23 on the image capturing surface 40 can be represented by using the following Equation (3).

$$(u, v) = \left( f\frac{x}{z}, f\frac{y}{z} \right) \qquad (3)$$

Generally, the two-dimensional coordinates (u, v) on the image capturing surface 40 can be calculated by using Equation (3) on the basis of the position of the optical center of the camera, the focal length f of the camera, the three-dimensional coordinates p=(x, y, z) of the measurement point 23, and the camera direction (triaxial rotation angle r=(α1, β1, γ1)). Furthermore, α1 denotes the rotation angle with respect to the X axis, β1 denotes the rotation angle with respect to the Y axis, and γ1 denotes the rotation angle with respect to the Z axis.

Conversely, the camera direction (triaxial rotation angle r=(α1, β1, γ1)) can be determined by using Equation (3) on the basis of the position of the optical center of the camera, the focal length f of the camera, the three-dimensional coordinates p=(x, y, z) of the measurement point 23, and the two-dimensional coordinates (u, v) on the image capturing surface 40.

The function F for calculating the two-dimensional coordinates (u, v) on the image capturing surface 40 is obtained by using the relation of Equation (3) on the basis of the triaxial rotation angle r=(α1, β1, γ1) and the three-dimensional coordinates p=(x, y, z) of the measurement point 23 ((u, v)=F(r, p)).

The first-camera direction calculating unit 33 performs a least squares approximation by using the following Equation (4), thereby calculating the triaxial rotation angle r=(α1, β1, γ1).

$$E_2(r) = \sum_{i=1}^{n} |F(r, pi) - (ui, vi)|^2 \qquad (4)$$

Here, n is the number of the measurement points 23. pi is the three-dimensional coordinates of the i-th measurement point 23. (ui, vi) is the two-dimensional coordinates that correspond to the i-th measurement point 23 and that is on the image capturing surface 40.

As the camera direction (the triaxial rotation angle r) has three variables, if the two-dimensional coordinates of two points on the image capturing surface 40 are present as a restriction condition, the camera direction can be determined by using Equation (3). The reason why the first-camera direction calculating unit 33 calculates the triaxial rotation angle r=(α1, β1, γ1) by using Equation (4) is that the first captured image is captured through the front windshield. Specifically, as the first captured image has a distortion that is caused due to the front windshield, it is preferable to calculate the triaxial rotation angle r=(α1, β1, γ1) by using a large number of the measurement points 23 and by performing a least squares approximation using Equation (4).

Furthermore, if a distortion is different depending on (u, v), and, for example, if it is previously predicted that a peripheral section of the image is largely distorted compared to the middle of the screen, the position of the measurement point may be accordingly located such that the measurement point 23 appears in the middle section of the first captured image. Moreover, in Equation (4), weighting may be applied depending on the measurement point 23.

Furthermore, the measurement point 23 of the distance measurement device 22 is used as the measurement point 23; however, the arbitrary measurement point 23 may be used if its coordinates are known in the object coordinate system. For example, the arbitrary measurement point 23 that is on the measurement tool 20 and that is suitable for measurement or the arbitrary measurement point 23 that is not on the measurement tool 20 and that is suitable for measurement may be used.

Returning to FIG. 6, the first-camera direction calculating unit 33 inputs, to the distance calculating unit 36, the direction (triaxial rotation angle r=(α1, β1, γ1)) of the first camera 1 that is calculated by using the above-described Equation (4).

The second-camera position calculating unit 34 calculates the three-dimensional coordinates (hereinafter, referred to as the "second camera coordinate") that indicate the position of the optical center $O_1$ of the second camera 2 by using the object coordinate system on the basis of multiple (four in the present embodiment) pieces of second distance information. As the method for calculating the second camera coordinates is the same as the method for calculating the first camera coordinates, its detailed explanation is omitted. The second-camera position calculating unit 34 inputs, to the second-camera direction calculating unit 35, the second camera coordinates that are calculated by using the object coordinate system. Furthermore, the second-camera position calculating unit 34 inputs, to the parallax calculating unit 38, the second camera coordinates that are calculated by using the object coordinate system.

The second-camera direction calculating unit 35 receives, from the receiving unit 31, the second captured image and the three-dimensional coordinate information on the distance measurement device 22 (the measurement point 23) in the object coordinate system. Moreover, the second-camera direction calculating unit 35 receives, from the second-camera position calculating unit 34, the second camera coordinates that are calculated by using the object coordinate system.

The second-camera direction calculating unit 35 uses the camera coordinate system to calculate the direction (the direction of the optical axis) of the second camera 2 on the basis of the three-dimensional coordinates of the measurement point 23 (23a, 23b, 23c, 23d), the two-dimensional coordinates of the image of the measurement point 23 (23a, 23b, 23c, 23d) in the second captured image, and the focal length of the second camera 2. As the method for calculating the direction of the second camera 2 is the same as the method for calculating the direction of the first camera 1, its detailed explanation is omitted. The second-camera direction calculating unit 35 inputs, to the distance calculating unit 36, the direction (triaxial rotation angle r=(α2, β2, γ2)) of the second camera 2.

The distance calculating unit 36 receives, from the receiving unit 31, the three-dimensional coordinate information on the marks 21 in the object coordinate system. Furthermore, the distance calculating unit 36 receives, from the first-camera position calculating unit 32, the first camera coordinates that are calculated by using the object coordinate system. Furthermore, the distance calculating unit 36 receives the direction (triaxial rotation angle r=(α1, β1, γ1)) of the first camera 1 from the first-camera direction calculating unit 33. Furthermore, the distance calculating unit 36 receives, from the second-camera position calculating unit 34, the second camera coordinates that are calculated by using the object coordinate system. Moreover, the distance calculating unit 36 receives the direction (triaxial rotation angle r=(α2, β2, γ2)) of the second camera 2 from the second-camera direction calculating unit 35.

With respect to each of the marks 21, the distance calculating unit 36 calculates the distances d between the optical center $O_0$ of the first camera 1 and the marks 21 in the direction of the optical axis of the first camera 1 by using the first-camera coordinate system based on the first camera coordinates and the direction of the first camera 1.

Specifically, the distance calculating unit 36 first rotates the camera coordinate system, in which the first camera coordinates are the origin, based on the direction (triaxial rotation angle r=(α1, β1, γ1)) of the first camera 1, thereby converting it into the first-camera coordinate system. That is, the first-camera coordinate system is the coordinate system where the first camera coordinates are the origin, the direction of the optical axis of the first camera 1 is the Z axis, the straight line that passes through the origin in a horizontal direction on the plane that is vertical to the Z axis that includes the origin is the X axis, and the straight line that passes through the origin in a vertical direction on the plane that is vertical to the Z axis that includes the origin is the Y axis. Next, the distance calculating unit 36 uses the first-camera coordinate system and Equation (1) to calculate the distances d between the optical center $O_0$ of the first camera 1 and the marks 21 in the direction of the optical axis of the first camera 1 (see FIG. 3). Thus, the relative position between the object (the marks 21) and the stereo camera 10

(the optical center $O_0$ of the first camera 1) is made definite. The distance calculating unit 36 inputs, to the ideal-parallax calculating unit 37, the distance information that indicates the distance d between each of the marks 21 and the stereo camera 10.

Furthermore, the distance calculating unit 36 may calculate the distances d between the optical center $O_1$ of the second camera 2 and the marks 21 in the direction of the optical axis of the second camera 2 by using the second-camera coordinate system based on the second camera coordinates and the direction of the second camera 2.

The ideal-parallax calculating unit 37 receives the above-described distance information from the distance calculating unit 36. Based on the above-described distance information, the ideal-parallax calculating unit 37 calculates ideal parallaxes that indicate the ideal parallaxes between the marks 21 included in the first captured image and the marks 21 included in the second captured image by using Equation (1) with respect to each of the marks 21. The ideal-parallax calculating unit 37 inputs the ideal parallaxes to the determining unit 39.

The parallax calculating unit 38 receives the first captured image and the second captured image from the receiving unit 31. The parallax calculating unit 38 calculates, with respect to each of the marks 21, the parallaxes between the marks 21 included in the first captured image and the marks 21 included in the second captured image. The parallax calculating unit 38 inputs the parallaxes to the determining unit 39.

The determining unit 39 receives the ideal parallaxes from the ideal-parallax calculating unit 37 and receives the parallaxes from the parallax calculating unit 38. Furthermore, the determining unit 39 receives the first captured image and the second captured image from the receiving unit 31. The determining unit 39 determines a calibration parameter for correcting the first captured image and the second captured image on the basis of the parallaxes and the ideal parallaxes. For example, the determining unit 39 determines a calibration parameter for a correction such that the difference between the parallaxes and the ideal parallaxes becomes zero.

Furthermore, if a parallax occurs in a vertical direction (the Y-axis direction), the determining unit 39 determines a calibration parameter for a correction such that the parallax in the vertical direction becomes zero regardless of the distance to the object (multiple marks). The reason for this is that it is assumed that a parallax occurs only in a horizontal direction (the X-axis direction).

Figure 10:
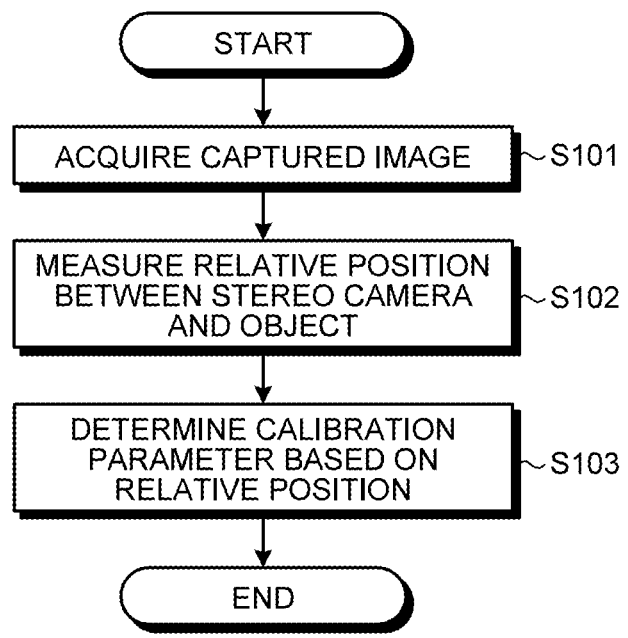
FIG. 10 is an overall schematic flowchart of a calibration method according to the first embodiment.

FIG. 10 is an overall schematic flowchart of a calibration method according to the first embodiment. The stereo camera 10 acquires the captured image (Step S101). Specifically, the first camera 1 acquires the first captured image, and the second camera 2 acquires the second captured image.

Next, the calibration device 30 measures the relative position between the stereo camera 10 and the object (Step S102). Specifically, the calibration device 30 measures the relative positions between the optical center $O_0$ of the first camera 1 of the stereo camera 10 and the marks 21 on the measurement tool 20 by performing Step S6 to Step S10 that are described below.

Next, the calibration device 30 determines a calibration parameter based on the relative position (Step S103). Specifically, the calibration device 30 determines a calibration parameter for correcting at least one of the first captured image and the second captured image such that the parallaxes between the marks 21 included in the first captured image and the marks 21 included in the second captured image matches ideal parallaxes that indicates the ideal parallaxes based on the relative positions that are measured at Step S102.

Figure 11:
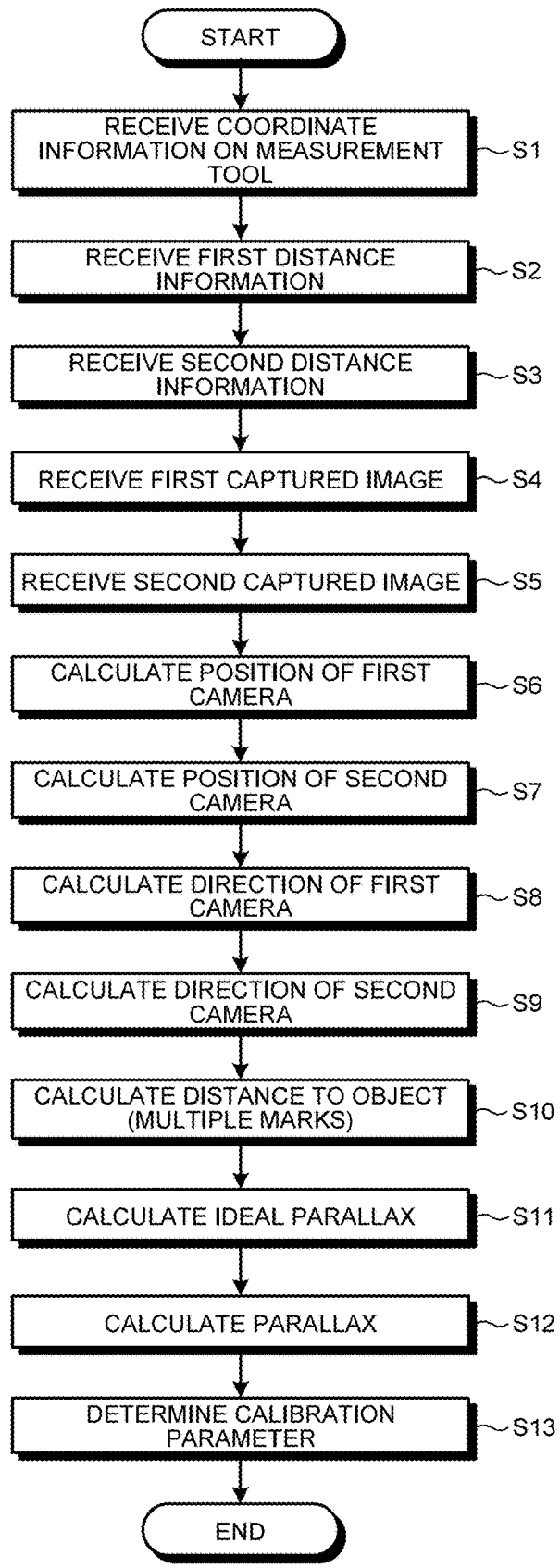
FIG. 11 is a flowchart that illustrates an example of the calibration method for the calibration device according to the first embodiment.

Next, a detailed explanation is given of a calibration method of the calibration device 30 according to the present embodiment with reference to the flowchart. FIG. 11 is a flowchart that illustrates an example of the calibration method for the calibration device 30 according to the first embodiment.

The receiving unit 31 receives the coordinate information on the measurement tool 20 (Step S1). The coordinate information is the three-dimensional coordinate information on the multiple (five in the present embodiment) marks 21 in the object coordinate system and the three-dimensional coordinate information on the multiple (four in the present embodiment) distance measurement devices 22 (the measurement points 23) in the object coordinate system. Furthermore, the receiving unit 31 receives multiple (four in the present embodiment) pieces of first distance information (Step S2). Furthermore, the receiving unit 31 receives multiple (four in the present embodiment) pieces of second distance information (Step S3). Furthermore, the receiving unit 31 receives the first captured image that includes the measurement tool 20 as an object (Step S4). Moreover, the receiving unit 31 receives the second captured image that includes the measurement tool 20 as an object (Step S5).

Next, the first-camera position calculating unit 32 calculates the first camera coordinates that indicate the position of the optical center $O_0$ of the first camera 1 by using the object coordinate system on the basis of the multiple pieces of first distance information and the three-dimensional coordinate information on the distance measurement device 22 (the measurement point 23) in the object coordinate system (Step S6).

Next, the second-camera position calculating unit 34 calculates the second camera coordinates that indicate the position of the optical center $O_1$ of the second camera 2 by using the object coordinate system on the basis of the multiple pieces of second distance information and the three-dimensional coordinate information on the distance measurement device 22 (the measurement point 23) in the object coordinate system (Step S7).

Next, the first-camera direction calculating unit 33 uses the camera coordinate system to calculate the direction (the direction of the optical axis) of the first camera 1 on the basis of the three-dimensional coordinates of the measurement point 23 (23a, 23b, 23c, 23d), the two-dimensional coordinates of the image of the measurement point 23 in the first captured image, and the focal length of the first camera 1 (Step S8).

Next, the second-camera direction calculating unit 35 uses the camera coordinate system to calculate the direction (the direction of the optical axis) of the second camera 2 on the basis of the three-dimensional coordinates of the measurement point 23 (23a, 23b, 23c, 23d), the two-dimensional coordinates of the image of the measurement point 23 in the second captured image, and the focal length of the second camera 2 (Step S9).

Next, with respect to each of the marks 21, the distance calculating unit 36 uses the first-camera coordinate system that is based on the first camera coordinates and the direction of the first camera 1 to calculate the distances d between the optical center $O_0$ of the first camera 1 and the marks 21 in the direction of the optical axis of the first camera 1 (Step S10). At Step S6 to Step S10, the relative position between the object (the marks 21) and the stereo camera 10 (the optical center $O_0$ of the first camera 1) is made definite.

Next, based on the distances d in the direction of the optical axis of the first camera 1, which is calculated at Step S10, the ideal-parallax calculating unit 37 calculates ideal parallaxes that indicates the ideal parallaxes between the marks 21 included in the first captured image and the marks 21 included in the second captured image by using Equation (1) with respect to each of the marks 21 (Step S11).

Next, the parallax calculating unit 38 calculates, with respect to each of the marks 21, the parallaxes between the marks 21 included in the first captured image and the marks 21 included in the second captured image (Step S12).

Next, the determining unit 39 determines a calibration parameter for correcting the first captured image and the second captured image such that the differences between the parallaxes and the ideal parallaxes become zero (Step S13).

Furthermore, at the above-described Step S10, the distance calculating unit 36 may use the second-camera coordinate system that is based on the second camera coordinates and the direction of the second camera 2 to calculate the distances d between the optical center $O_1$ of the second camera 2 and the marks 21 in the direction of the optical axis of the second camera 2.

Figure 12:
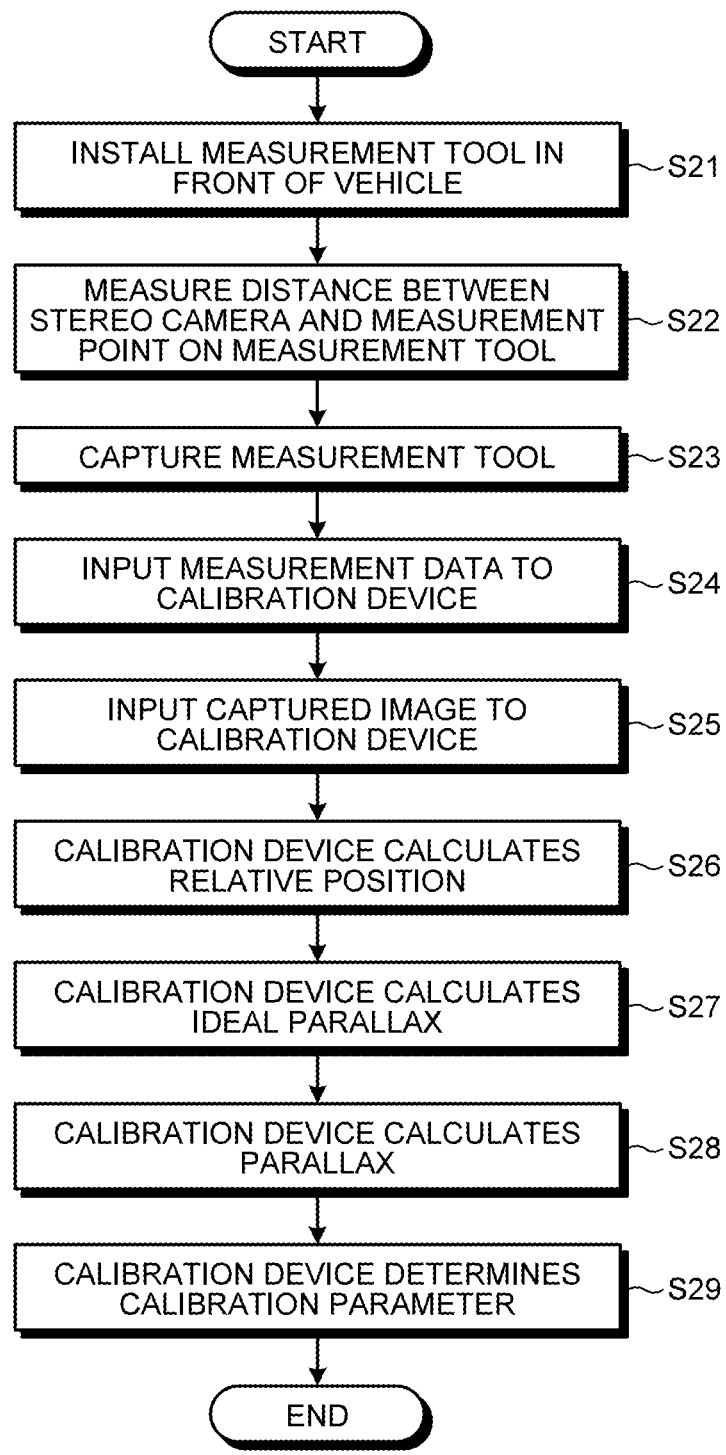
FIG. 12 is a flowchart that illustrates an example of the overall flow of the calibration method according to the first embodiment.

Next, an explanation is given of the overall flow of the calibration method that uses the above-described measurement tool 20 and the above-described calibration device 30 according to the present embodiment. FIG. 12 is a flowchart that illustrates an example of the overall flow of the calibration method according to the first embodiment.

First, the measurement tool 20 is installed in front of a vehicle where the stereo camera 10 is mounted such that they almost face each other (Step S21). Next, the measurement tool 20 measures the distances between the optical center $O_0$ of the stereo camera 10 and the measurement points 23 on the measurement tool 20 (Step S22). Specifically, the distance measurement devices 22 on the four corners of the measurement tool 20 are appropriately rotated, and the distance to the optical center $O_0$ of the stereo camera 10 is measured through the front windshield of the vehicle. Next, the stereo camera 10 captures an image of the measurement tool 20 through the front windshield without changing the position of the measurement tool 20 (Step S23).

Next, the measurement data that is measured at Step S22 is input to the calibration device 30 (Step S24). At this time, the coordinates that are in the object coordinate system and that indicate the marks 21 on the measurement tool 20 and the coordinates that are in the object coordinate system and that indicate the measurement points 23 on the measurement tool 20 are simultaneously input. Next, the captured image that is captured at Step S23 is input to the calibration device 30 (Step S25).

Next, the calibration device 30 calculates the relative position between the measurement tool 20 and the optical center $O_0$ of the stereo camera 10 (Step S26). Specifically, the calibration device 30 calculates the position and the direction of the stereo camera 10 (Step S6 to Step S9 of FIG. 11). Then, the calibration device 30 calculates the distance d between the measurement tool 20 (the marks 21) and the optical center $O_0$ of the stereo camera 10 in the direction of the optical axis of the first camera 1 (Step S10 of FIG. 11).

Next, the calibration device 30 calculates the ideal parallaxes on the basis of the relative position that is calculated at Step S26 (Step S27). Specifically, the calibration device 30 calculates the ideal parallaxes by using the method of Step S11 in FIG. 11. Then, the calibration device 30 calculates parallaxes on the basis of the captured image that is input at Step S25 (Step S28). Specifically, the calibration device 30 calculates parallaxes by using the method of Step S12 in FIG. 11. Then, the calibration device 30 determines a calibration parameter for calibrating the stereo camera 10 on the basis of the relative position and the captured image (Step S29). Specifically, the calibration device 30 determines a calibration parameter for calibrating the captured image that is captured by the stereo camera 10 on the basis of the ideal parallaxes that are calculated from the relative position and the parallaxes that are calculated from the captured image (Step S13 of FIG. 11).

As described above, with the calibration method according to the first embodiment, the relative position between the stereo camera 10 and the measurement tool 20 that is installed such that it falls within the image capturing area of the stereo camera 10 is measured, and a calibration parameter for calibrating the stereo camera 10 is determined on the basis of the relative position and the captured image that is captured by the stereo camera 10 and that includes the measurement tool 20 as an object. Thus, it is possible to calculate a calibration parameter with high accuracy with respect to the stereo camera 10 that is installed in a vehicle for which it is difficult to ensure the installation location accuracy.

Furthermore, in the first embodiment, an explanation is given of a case where a calibration is performed on the stereo camera 10 that is installed in a car. However, the calibration method according to the first embodiment may be applied to the stereo camera 10 that is not limited to be installed in a vehicle (movable object), such as a car, but may be installed in any object. Moreover, if a calibration needs to be performed on the stereo camera 10 with higher accuracy even if the stereo camera 10 is not installed on an object, the method according to the present embodiment may be applied.

Modified Example of the First Embodiment

Next, an explanation is given of a modified example of the calibration method according to the first embodiment. With the calibration method according to the modified example of the first embodiment, the distance measurement device 22 does not measure the distance to the optical center of the first camera 1 (the second camera 2) but measures the distance to an intermediate measurement point that is located in the middle with respect to the optical center of the first camera 1 (the second camera 2). This is because it is difficult to directly measure the optical center of the camera as it is generally located inside a lens.

Figure 13:
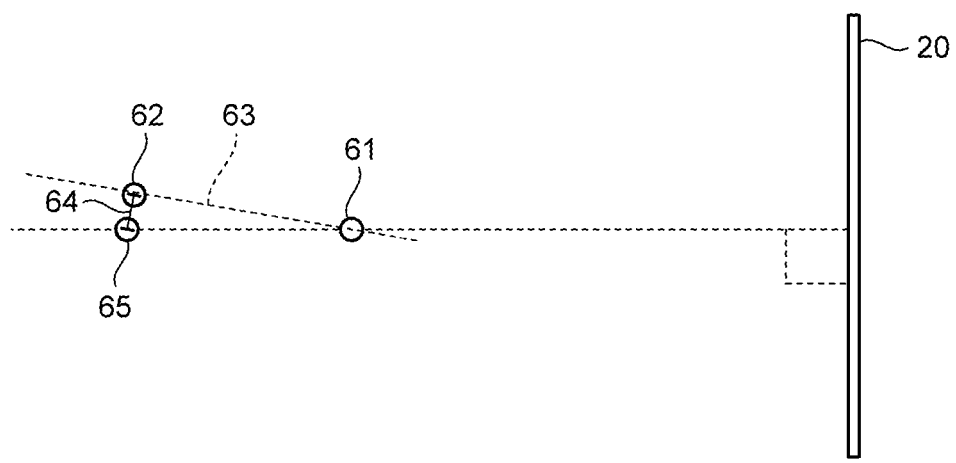
FIG. 13 is a diagram that illustrates an example of the case where the distance measurement device according to a modified example of the first embodiment measures the distance to the first camera (a second camera) by using an intermediate measurement point.

FIG. 13 is a diagram that illustrates an example of the case where the distance measurement device 22 according to the modified example of the first embodiment measures the distance to the first camera 1 (the second camera 2) by using the intermediate measurement point. FIG. 13 is an example of the case where an intermediate measurement point 61 is located in a direction perpendicular to the measurement device 20 and is located close to a position 62 of the first camera 1 (the second camera 2). For example, the intermediate measurement point 61 is located on the front windshield.

The distance measurement device 22 measures the distance information (hereafter, referred to as the "first intermediate distance information") that indicates the distance between the measurement point 23 on the measurement tool 20 and the intermediate measurement point that is provided near the optical center of the first camera 1. Furthermore, the distance measurement device 22 measures the distance information (hereafter, referred to as the "second intermediate distance information") that indicates the distance between the measurement point 23 on the measurement tool 20 and the intermediate measurement point that is provided near the optical center of the second camera 2.

The receiving unit 31 receives the first intermediate distance information and the second intermediate distance information. Furthermore, the receiving unit 31 receives the distance from the intermediate measurement point 61 to the optical center of the first camera 1 (the second camera 2) as the distance information that is separately acquired from a measured value, designed value, or the like.

The first-camera position calculating unit 32 (the second-camera position calculating unit 34) first determines the coordinates that indicate the position of the intermediate measurement point 61 by using Equation (2). Next, the first-camera position calculating unit 32 (the second-camera position calculating unit 34) calculates the coordinates of the optical center of the first camera 1 (the second camera 2) by using the coordinates that indicate the position of the intermediate measurement point 61 and the distance information that indicates the distance from the intermediate measurement point 61 to the optical center of the first camera 1 (the second camera 2).

Furthermore, the distance from the intermediate measurement point 61 to the optical center of the first camera 1 (the second camera 2) may be separately measured by using the camera coordinate system without using the object coordinate system of the measurement tool 20. Furthermore, if the difference between the direction of a camera optical axis 63 and the direction of the straight line that is perpendicular to the measurement tool 20 is small, a position 65 that is located on the straight line that is perpendicular to the measurement tool 20 may be regarded as the position of the optical center of the first camera 1 (the second camera 2). This is because an error 64 from the actual position of the first camera 1 (the second camera 2) is vanishingly small.

Furthermore, the distance between the intermediate measurement point 61 and the measurement point 23 of the measurement tool 20 may be measured by using a measuring tape, or the like, without using the distance measurement device 22.

Second Embodiment

Next, an explanation is given of a second embodiment. A measurement tool that is used for a calibration of the stereo camera 10 in the second embodiment is different from that in the first embodiment. Any one of the first camera 1 and the second camera 2 is used for a calibration of the stereo camera 10 in the second embodiment. Although an explanation is given in the second embodiment by using the first camera 1, the second camera 2 may be used.

Figure 14:
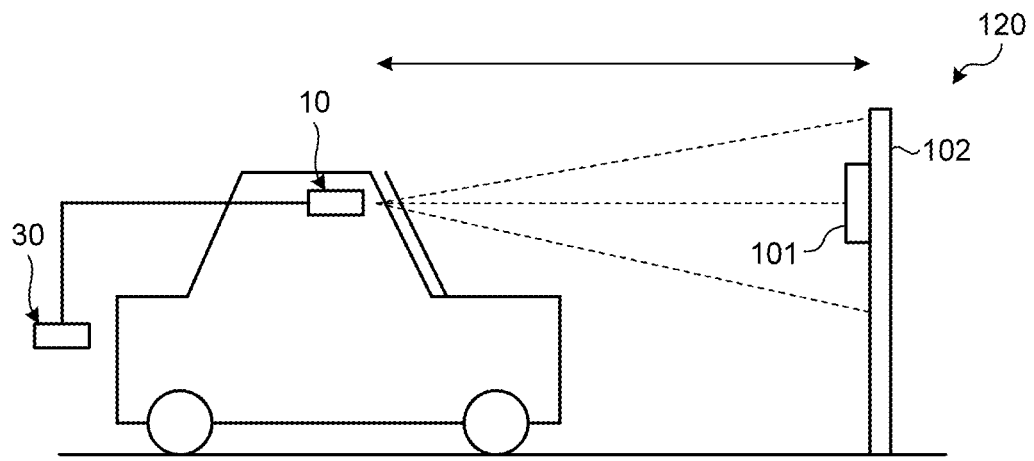
FIG. 14 is a diagram that illustrates an example of the relationship among a measurement tool of a second embodiment, the stereo camera, and the calibration device.

FIG. 14 is a diagram that illustrates an example of the relationship among a measurement tool 120 of the second embodiment, the stereo camera 10, and the calibration device 30. According to the second embodiment, the measurement tool 120 is used instead of the measurement tool 20. As the explanations of the stereo camera 10 and the calibration device 30 are the same as those in FIG. 1, they are omitted. The measurement tool 120 is used to measure the relative position with the stereo camera 10 as is the case with the measurement tool 20 of the first embodiment; however, its configuration is different from that of the measurement tool 20 according to the first embodiment. The measurement tool 120 according to the second embodiment includes an angle measurement plate 101 and a first member 102. The angle measurement plate 101 is used to measure the angle that indicates a displacement of the measurement tool 120 that is tilted in a horizontal direction and the angle that indicates a displacement of the measurement tool 120 that is tilted in a vertical direction. The first member 102 is used as a chart for a calibration of the stereo camera 10.

Figure 15A:
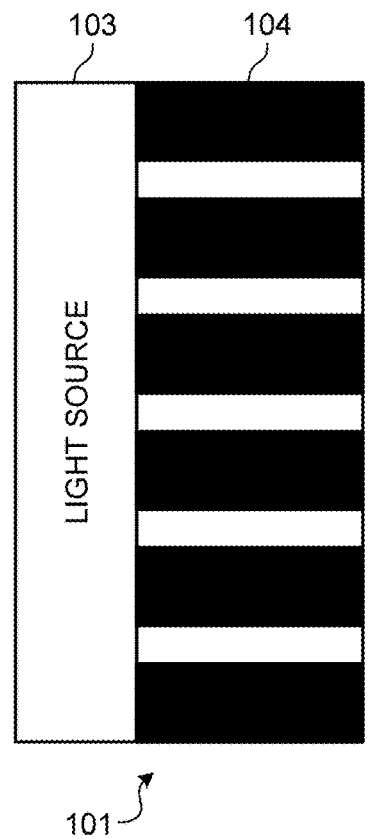
FIG. 15A is a cross-sectional view that illustrates a cross-sectional surface of an angle measurement plate according to the second embodiment.
Figure 15B:
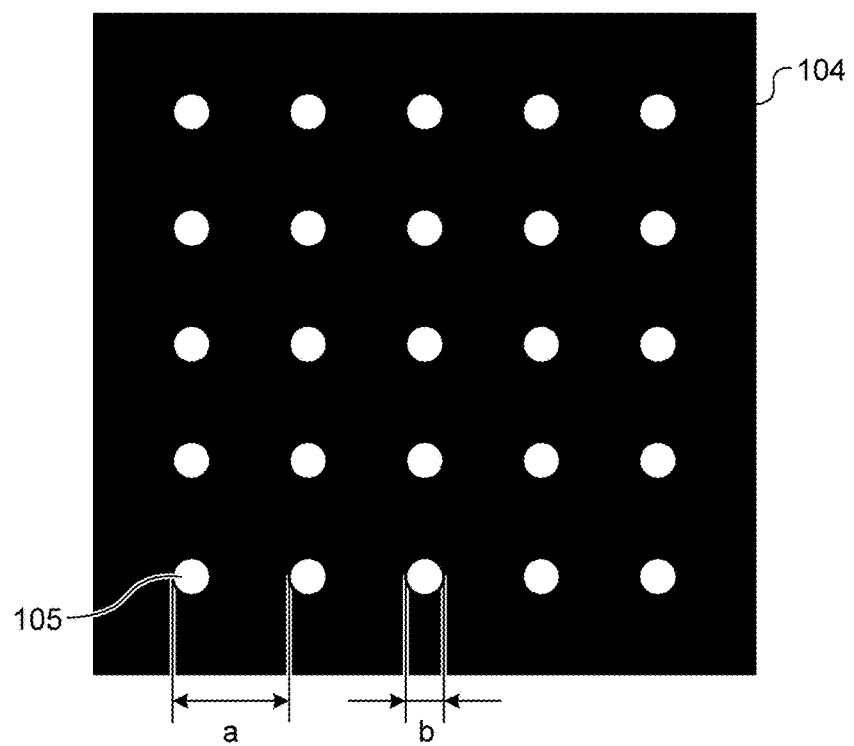
FIG. 15B is a front view that illustrates the front surface of the angle measurement plate according to the second embodiment.
Figure 16:
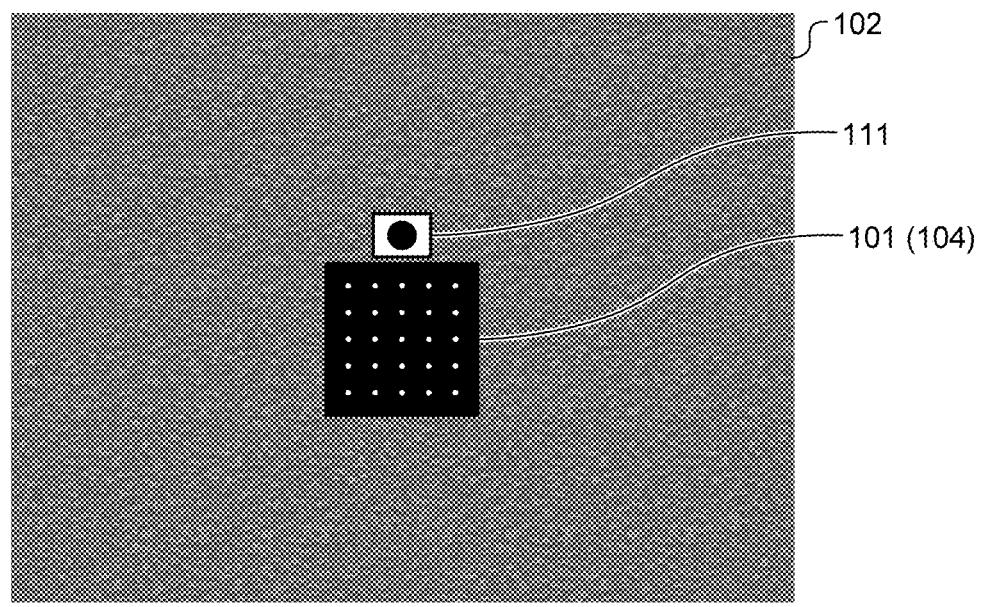
FIG. 16 is a front view of a first member according to the second embodiment.

A detailed explanation is given, with reference to FIG. 15A to FIG. 16, of a configuration of the measurement tool 120. FIG. 15A is a cross-sectional view that illustrates a cross-sectional surface of the angle measurement plate 101 according to the second embodiment. FIG. 15B is a front view that illustrates the front surface of the angle measurement plate 101 according to the second embodiment. FIG. 16 is a front view of the first member 102 according to the second embodiment.

The angle measurement plate 101 includes a light source 103 and a second member 104. The light source 103 is a plane diffused light source that has a uniform brightness distribution. Specifically, the light source 103 emits light with a uniform intensity regardless of the position on the surface of the first member 102 (light for which a difference in the light intensity depending on the position on the surface falls within a predetermined range).

The second member 104 is installed such that it covers the light source 103, and light of the light source 103 is emitted through multiple holes 105. Each of the holes 105 is formed in a direction perpendicular to the surface of the first member 102 with a predetermined pitch. In the example of FIG. 15B, the circular holes 105 with a diameter b are formed such that they are aligned with a pitch a in vertical and horizontal directions. Furthermore, the number, the shape, and the way of arrangement of the holes 105 are not limited to the configuration of FIG. 15B and may be optional. Furthermore, the material of the second member 104 may be optional. The material of the second member 104 is, for example, a metal.

The angle measurement plate 101 (the second member 104) is located in the middle of the surface of the first member 102. Furthermore, the first member 102 includes a mark 111 on the top of the angle measurement plate 101 (the second member 104). The mark 111 is used as a reference point for calculating the distance between the first member 102 (the measurement tool 120) and the stereo camera 10 (the first camera 1) that is the target to be calibrated. Furthermore, as is the case with the surface of the measurement tool 20 according to the first embodiment, the surface of the first member 102 has a shading pattern that makes it easier to detect a corresponding point that is on the second captured image and that corresponds to a point on the first captured image.

Figure 17:
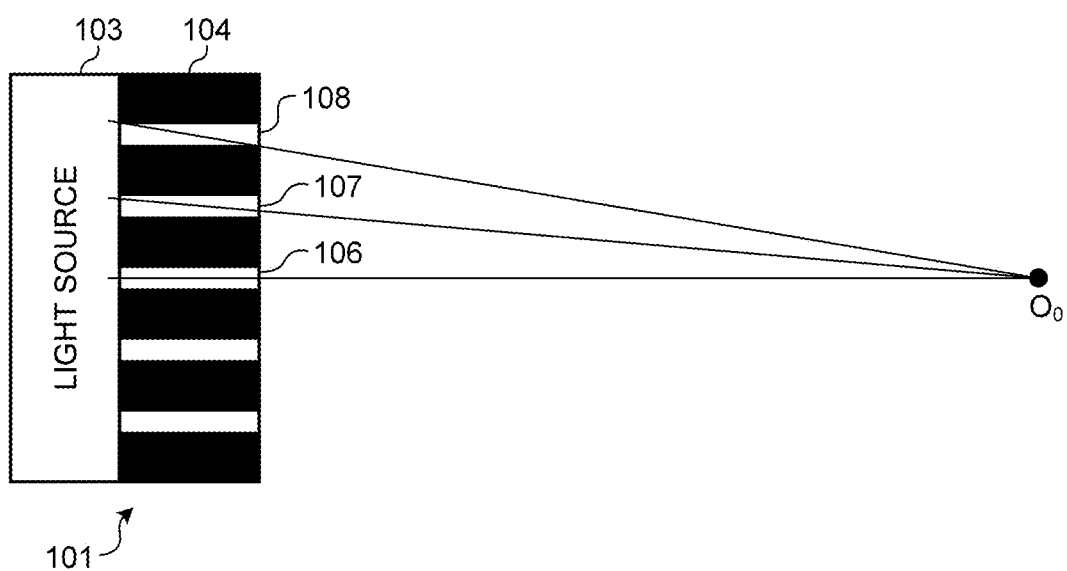
FIG. 17 is a diagram that illustrates a case where a hole 106, a hole 107, and a hole 108 that are formed on a second member are seen from the position of the optical center of the first camera.
Figure 18A:
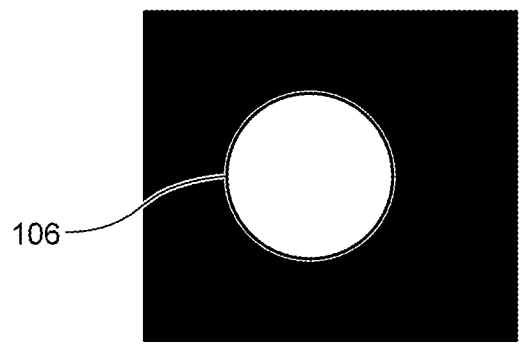
FIG. 18A is a diagram that illustrates the shape of the hole 106 when the hole 106 is seen from the position of the optical center of the first camera.
Figure 18B:
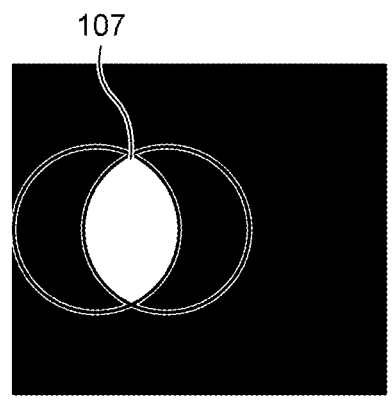
FIG. 18B is a diagram that illustrates the shape of the hole 107 when the hole 107 is seen from the position of the optical center of the first camera.
Figure 18C:
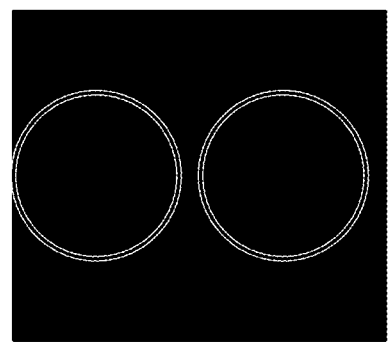
FIG. 18C is a diagram that illustrates the shape of the hole 108 when the hole 108 is seen from the position of the optical center of the first camera.

FIG. 17 is a diagram that illustrates a case where a hole 106, a hole 107, and a hole 108 that are formed on the second member 104 are seen from the position of the optical center $O_0$ of the first camera 1. With respect to the position of the hole 106, the line of sight from the position of the optical center $O_0$ runs at right angles to the surface of the second member 104; therefore, light of the light source 103 that is located behind the second member 104 looks like the shape of FIG. 18A. With respect to the position of the hole 107, the line of sight from the position of the optical center $O_0$ enters the hole 107 of the second member 104 at a tilt; therefore, light of the light source 103 that is located behind the second member 104 looks like the shape of FIG. 18B. With respect to the position of the hole 108, the line of sight from the position of the optical center $O_0$ does not enter the hole 108 of the second member 104; therefore, light of the light source 103 that is located behind the second member 104 is invisible (FIG. 18C).

Specifically, if an image of the angle measurement plate 101 (the second member 104) is captured by the first camera 1 that has a much higher resolution compared to the pitch a of the holes, the image of the hole near the point where the line of sight from the optical center $O_0$ of the first camera 1 runs at right angles to the surface of the second member 104 in the captured image is large. Furthermore, the area of the image of the hole declines as it is farther away from the point where the line of sight from the optical center $O_0$ of the first camera 1 runs at right angles to the surface of the second member 104, and the image of the hole at a position much farther away is not captured.

Here, an explanation is given of the pitch a of the holes 105 of the second member 104. The pitch a of the holes 105 in FIG. 15B is set to be lower than the resolution limit of the stereo camera 10 (the first camera 1). For example, if the condition is a (half) view angle of 20 degrees, an image capturing distance (calibration distance) of 2 m, and the pixel sensor of 640×480, and if the pitch a is approximately equal to or less than 2 mm, it is smaller than the pixel pitch according to the following Equation (5).

$$\tan(20[\deg]) \times 2000/320 \approx 2.3 \quad (5)$$

Figure 19A:
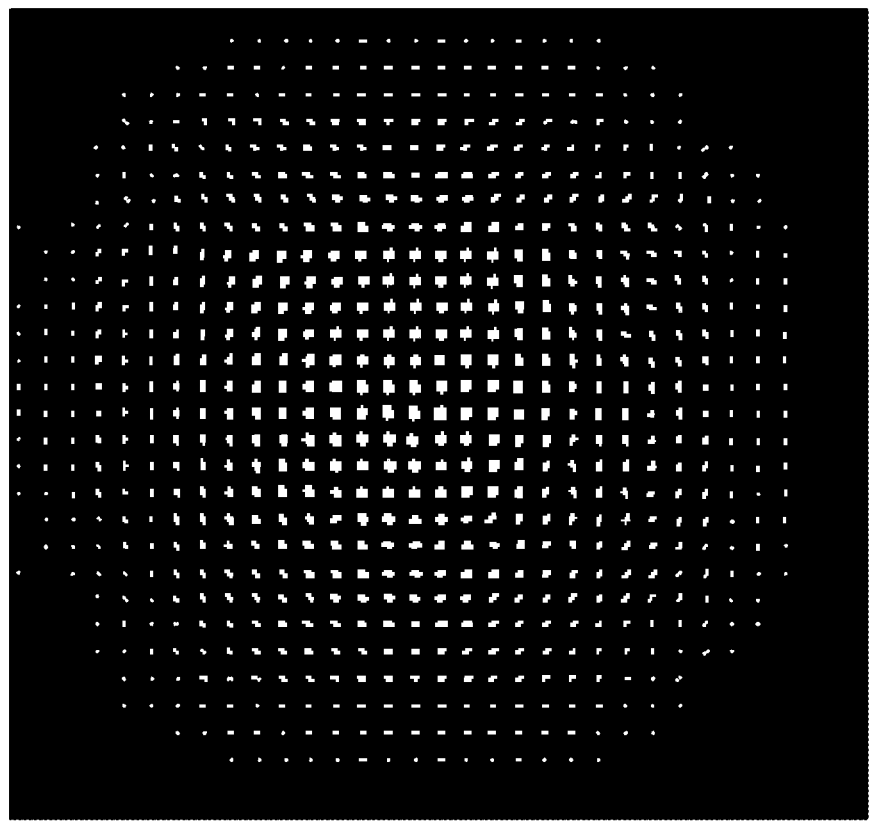
FIG. 19A is a diagram that illustrates an image of the angle measurement plate in a case where optical unsharpness is not included.

In a case where the pitch a is smaller than the pixel pitch, if an image of the angle measurement plate 101 (the second member 104) is captured by the stereo camera 10 (the first camera 1), the captured image looks as in FIG. 19A. However, in actuality, even if the pitch a is approximately equal to or less than 2 mm, it exceeds the resolution limit due to the effect of a pixel aperture feature, unsharpness of an imaging forming optical system, or optical unsharpness of an optical LPF (Low Pass Filter), or the like, in the case of a color camera. Therefore, it is difficult to discriminate among the individual holes in the captured image, and a single large brightness mountain (brightness distribution) like FIG. 19B in a form as if the image of FIG. 19A is shaded off is obtained. The top of the mountain of brightness in FIG. 19B corresponds to, for example, the vicinity of the hole 106 in FIG. 17. Furthermore, the foot of the mountain of brightness in FIG. 19B corresponds to, for example, the vicinity of the hole 108 in FIG. 17.

Figure 19B:
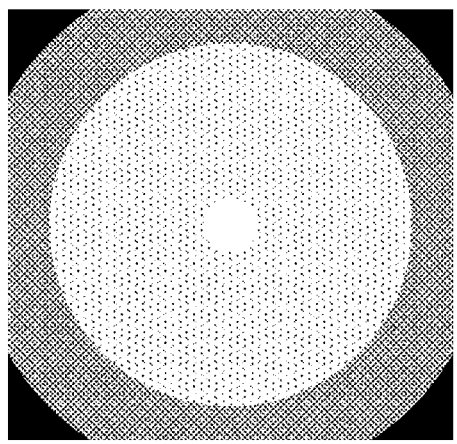
FIG. 19B is a diagram that illustrates an image of the angle measurement plate in a case where optical unsharpness is included.
Figure 20:
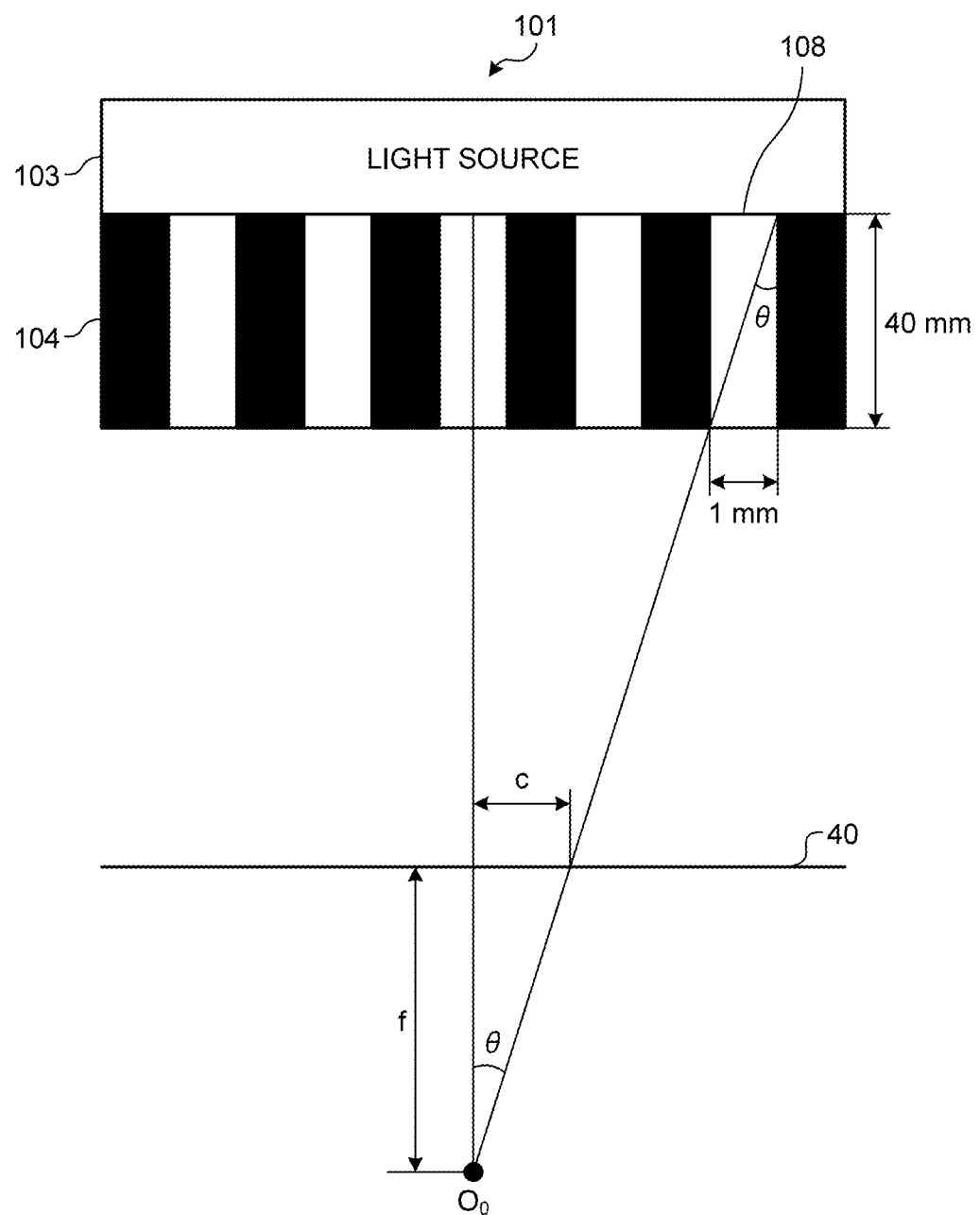
FIG. 20 is a diagram that illustrates the measurement of the radius of the foot of the mountain of brightness in FIG. 19B.

FIG. 20 is a diagram that illustrates the measurement of the radius c of the foot of the mountain of brightness in FIG. 19B. It is assumed that the thickness of the second member 104 is 40 mm and the diameter of the hole 108 is 1 mm. Furthermore, it is assumed that the (half) view angle of the stereo camera 10 (the first camera 1) is 20 degrees and the pixel sensor has 640×480 pixels. Here, the radius c of the foot of the mountain of brightness is about 22 pixels according to the following Equation (6).

$$c = f/40 \times 1 = 320/\tan(20[\deg])/40 \approx 22 \quad (6)$$

As described above, instead of the images of the individual holes 105 of FIG. 15B, the large smoothed continuous brightness mountain is considered; therefore, even if the position where the optical center $O_0$ of the stereo camera 10 (the first camera 1) is not right above the hole 105 corresponds to a direction perpendicular to the surface of the angle measurement plate 101, it can be determined that the position of brightness peak indicates a direction perpendicular to the surface of the angle measurement plate 101. Thus, regardless of the position of the optical center $O_0$ of the stereo camera 10 (the first camera 1), it is determined that the position of the brightness peak of the brightness mountain (brightness distribution) of the captured image by capturing an image of the angle measurement plate 101 indicates a direction perpendicular to the surface of the angle measurement plate 101.

Furthermore, the entire mountain of brightness is approximated by using a function, such as Gauss function ($\exp(-r^2)$), and an average distribution of a large number of pixel values is estimated; thus, the effect of random noise that is included in an individual pixel value can be reduced, and the position of the brightness peak can be accurately estimated.

Figure 21:
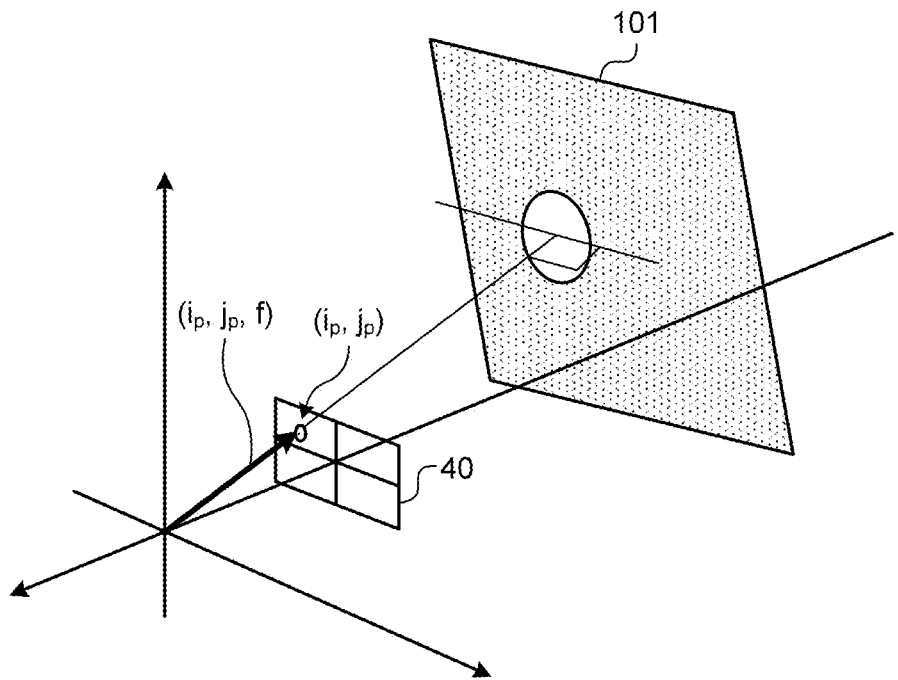
FIG. 21 is a diagram that illustrates the relationship between the position of the brightness peak of an image capturing surface and the tilt of the angle measurement plate.

FIG. 21 is a diagram that illustrates the relationship between the position of the brightness peak of the image capturing surface 40 and the tilt of the angle measurement plate 101. The middle of the image capturing surface 40 is used as an origin and representation is made in units of a pixel. Here, the coordinates $(i_p, j_p)$ of the position of the brightness peak on the image capturing surface 40 (the captured image) indicate the position of the foot of the perpendicular line drawn from the optical center $O_0$ of the stereo camera 10 (the first camera 1) to the angle measurement plate 101. Therefore, if the angle measurement plate 101 faces the stereo camera 10 (the first camera 1), i.e., if the normal to the surface of the measurement tool 120 is parallel to the optical axis of the stereo camera 10 (the first camera 1), the position of the brightness peak ought to be in the middle (origin) of the captured image. Specifically, if the position $(i_p, j_p)$ of the brightness peak deviates from the middle (origin) of the captured image, it is possible to determine, from the coordinates $(i_p, j_p)$ that are on the captured image (the image capturing surface 40) and that indicate the position of the brightness peak, the angle that indicates a displacement in a horizontal direction of the measurement tool 120 that is tilted with respect to a facing direction and the angle that indicates a displacement in a vertical direction. Specifically, if the focal length (in units of a pixel) of the stereo camera 10 (the first camera 1) is f, the direction of the normal to the angle measurement plate 101 can be determined by using $(i_p, j_p, f)$. In other words, it is possible to determine the direction of the stereo camera 10 (the first camera 1) that faces the angle measurement plate 101 that is installed such that it is tilted with respect to a facing direction.

Figure 22:
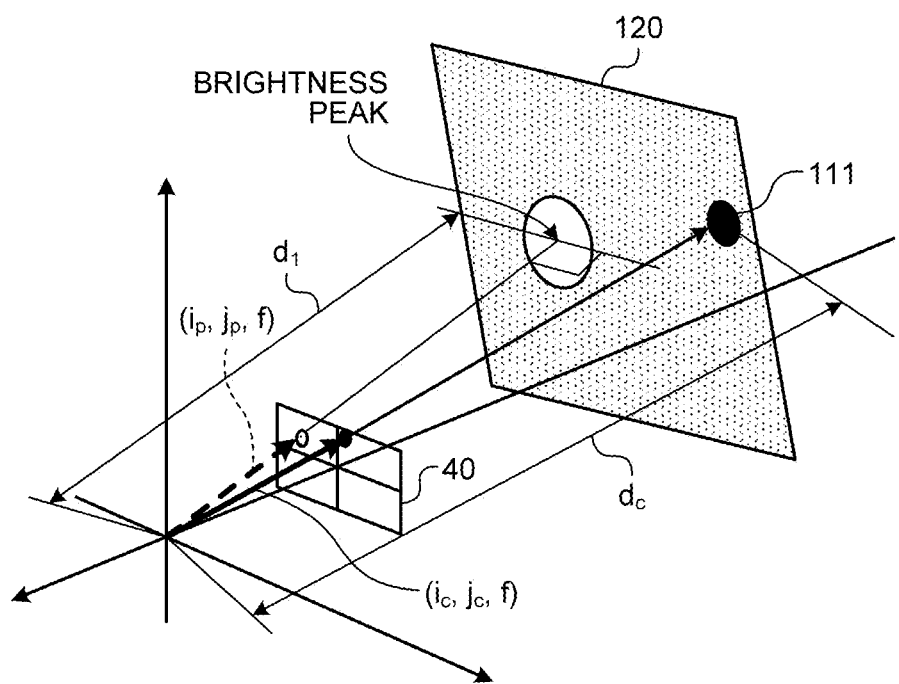
FIG. 22 is a diagram that illustrates the method for determining the equation of a plane that indicates the position of the measurement tool.

Next, a detailed explanation is given of a method for determining the equation of a plane that indicates the position of the angle measurement plate 101 (the measurement tool 120). FIG. 22 is a diagram that illustrates the method for determining the equation of a plane that indicates the position of the measurement tool 120. The following Equation (7) represents the equation of the plane that indicates the measurement tool 120 in the coordinate system that uses the optical center $O_0$ of the stereo camera 10 (the first camera 1) as an origin.

$$ax + by + cz + d = 0 \quad (7)$$

As illustrated in FIG. 21, the direction of the normal to the angle measurement plate 101 can be represented as $(i_p, j_p, f)$. Therefore, as the normal vector of the plane can be determined by using $(i_p, j_p, f)$, $(a, b, c) (i_p, j_p, f)$. Next, to determine a variable d of the equation of the plane, the mark 111 of the measurement tool 120 (the first member 102) is measured by using a laser distance meter, or the like, and the distance is defined as $d_c$. Furthermore, the coordinates that indicate the position of the mark 111 on the captured image are $(i_c, j_c)$. If the focal length (on a pixel to pixel basis) of the stereo camera 10 (the first camera 1) is f, the point $(x_c, y_c, z_c)$ by the distance $d_c$ in the direction of the vector $(i_c, j_c, f)$ is the coordinates that indicate the position of the mark 111. Specifically, the coordinates $(x_c, y_c, z_c)$ on the plane that indicates the position of the mark 111 can be calculated by using the following Equation (8).

$$(x_c, y_c, z_c) = \frac{d_c}{\sqrt{i_c^2 + j_c^2 + f^2}} (i_c, j_c, f) \quad (8)$$

Therefore, the variable d of the equation of the plane can be determined by using the following Equation (9) and the following Equation (10). Thus, the equation (a, b, c, d) of the plane that represents the measurement tool 120 can be determined.

$$ax_c + by_c + cz_c + d = 0 \quad (9)$$

$$d = i_p x_c - j_p y_c - f z_c \quad (10)$$

By using the captured image of the angle measurement plate 101, it is possible to calculate the angle that indicates a displacement due to a tilt of the angle measurement plate 101 in a horizontal direction and the angle that indicates a displacement due to a tilt in a vertical direction; however, the distance to the angle measurement plate 101 cannot be determined. Therefore, the position of the mark 111 on the captured image and the distance information $d_c$ to the mark 111 are used in the above explanation. Otherwise, it is possible to use a method of actually measuring $d_1$ of FIG. 22, or the like. Furthermore, if the location accuracy of the measurement tool 120 is higher (and the angle accuracy is lower) compared to the acceptable accuracy of a calibration of the stereo camera 10 (the first camera 1), a fixed value may be used as the distance information without actually measuring the distance between the mark 111 and the stereo camera 10.

Figure 23:
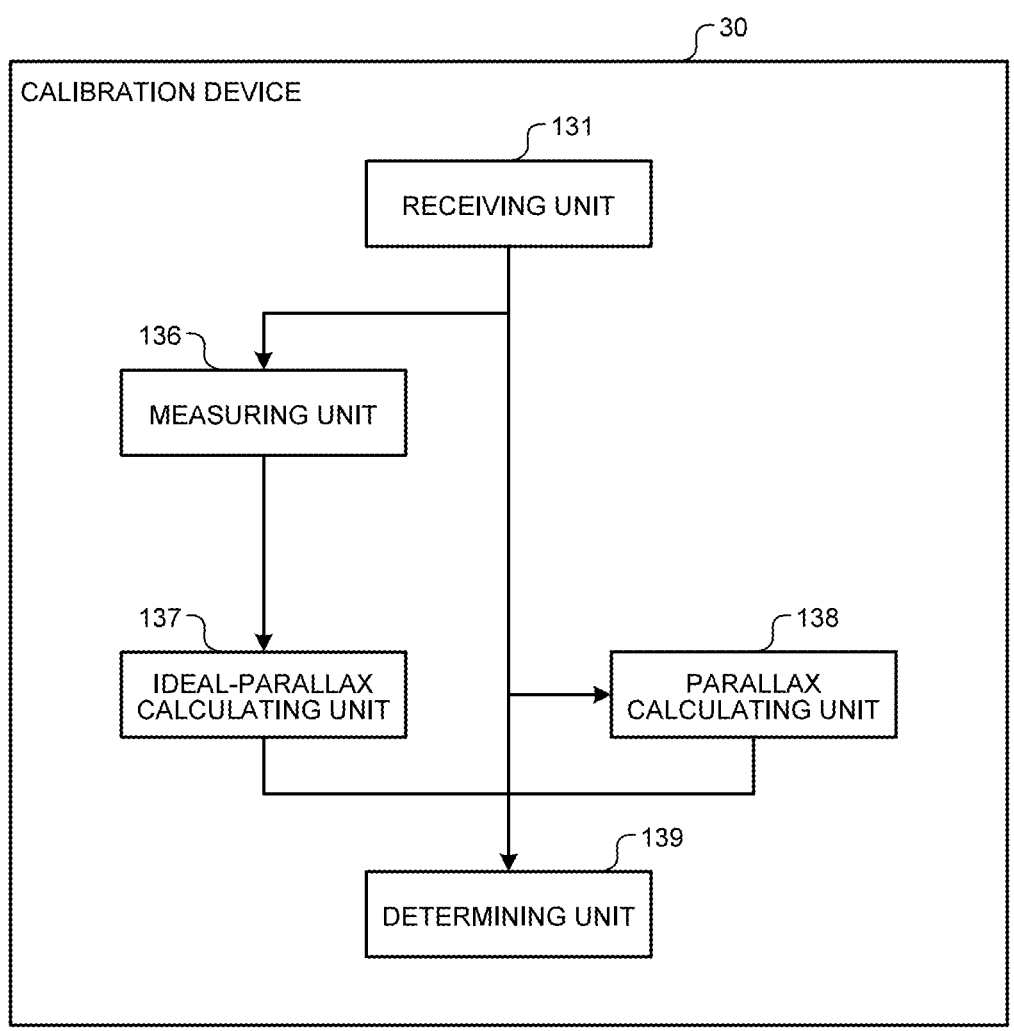
FIG. 23 is a diagram that illustrates an example of the configuration of the calibration device according to the second embodiment.

Next, an explanation is given of a configuration of the calibration device 30 according to the second embodiment for a calibration of the stereo camera 10 (the first camera 1) by using the above-described method. FIG. 23 is a diagram that illustrates an example of the configuration of the calibration device according to the second embodiment. The calibration device 30 according to the second embodiment includes a receiving unit 131, a measuring unit 136, an ideal-parallax calculating unit 137, a parallax calculating unit 138, and a determining unit 139.

The receiving unit 131 receives the captured image that is captured by the stereo camera 10 and includes the measurement tool 120 as an object (the first captured image that is captured by the first camera 1 and the second captured image that is captured by the second camera 2). Furthermore, the receiving unit 131 receives the above-described distance information $d_c$ (see FIG. 22). The receiving unit 131 inputs the first captured image and the distance information $d_c$ to the measuring unit 136. Furthermore, the receiving unit 131 inputs the captured image (the first captured image and the second captured image) to the parallax calculating unit 138.

The measuring unit 136 receives the first captured image and the distance information $d_c$ from the receiving unit 131. The measuring unit 136 determines the direction (normal vector) that is perpendicular to the surface of the measurement tool 120 (the angle measurement plate 101) by using the method that is illustrated in FIG. 21 on the basis of the position of the maximum brightness of the first captured image. Thus, the measuring unit 136 measures a deviation of the direction of the measurement tool 120 (the angle that indicates a displacement due to a tilt in a horizontal direction and the angle that indicates a displacement due to a tilt in a vertical direction) with respect to a facing position of the stereo camera 10 (the first camera 1). Furthermore, the equation of the plane that indicates the position of the measurement tool 120 in the first-camera coordinate system (the coordinate system in which the optical center $O_0$ of the first camera 1 is an origin) is determined by using the method that is illustrated in FIG. 22 on the basis of the normal vector and the distance information $d_c$. The measuring unit 136 inputs, to the ideal-parallax calculating unit 137, the information that indicates the equation of the plane.

The ideal-parallax calculating unit 137 receives, from the measuring unit 136, the equation of the plane that indicates the position of the measurement tool 120. The ideal-parallax calculating unit 137 uses the method that is illustrated in FIG. 3 to calculate an ideal parallax that indicates a parallax in the case where an image of the plane that is represented by the equation is captured. The ideal-parallax calculating unit 137 inputs the ideal parallax to the determining unit 139.

The parallax calculating unit 138 receives the captured image (the first captured image and the second captured image) from the receiving unit 131. The parallax calculating unit 138 uses a shading pattern of the measurement tool 120 (the first member 102), or the like, to detect a corresponding point that is in the second captured image and that corresponds to a point in the first captured image, thereby calculating a parallax. The parallax calculating unit 138 inputs the parallax to the determining unit 139.

The determining unit 139 receives the ideal parallax from the ideal-parallax calculating unit 137 and receives the parallax from the parallax calculating unit 138. Furthermore, the determining unit 139 receives the first captured image and the second captured image from the receiving unit 131. The determining unit 139 determines a calibration parameter for correcting the first captured image and the second captured image on the basis of the parallax and the ideal parallax. The determining unit 139 determines, for example, a calibration parameter for correcting at least one of the first captured image and the second captured image such that the difference between the parallax and the ideal parallax becomes zero.

Figure 24:
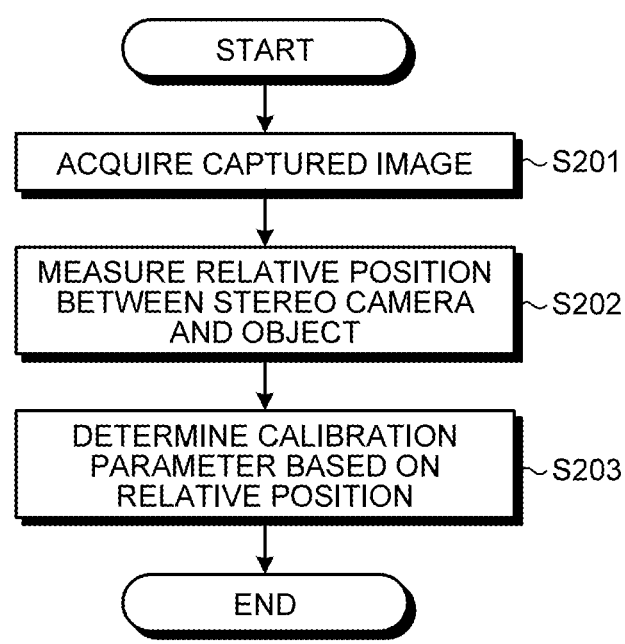
FIG. 24 is an overall schematic flowchart of the calibration method according to the second embodiment.

FIG. 24 is an overall schematic flowchart of the calibration method according to the second embodiment. The stereo camera 10 acquires the captured image (Step S201). Specifically, the first camera 1 acquires the first captured image, and the second camera 2 acquires the second captured image.

Next, the calibration device 30 measures the relative position between the stereo camera 10 and the object (Step S202). Specifically, the calibration device 30 measures the relative position between the optical center $O_0$ of the first camera 1 of the stereo camera 10 and the measurement tool 120 at Step S32 to Step S34 that are described later.

Next, the calibration device 30 determines a calibration parameter based on the relative position (Step S203). Specifically, the calibration device 30 determines a calibration parameter for correcting at least one of the first captured image and the second captured image such that the parallax that is calculated by detecting a corresponding point that is in the second captured image and that corresponds to a point in the first captured image by using a shading pattern of the measurement tool 120 (the first member 102), or the like, matches the ideal parallax that indicates the ideal parallax based on the relative position that is measured at Step S202.

Next, an explanation is given, with reference to the flowchart, of the details of the calibration method for the calibration device 30 according to the second embodiment.

Figure 25:
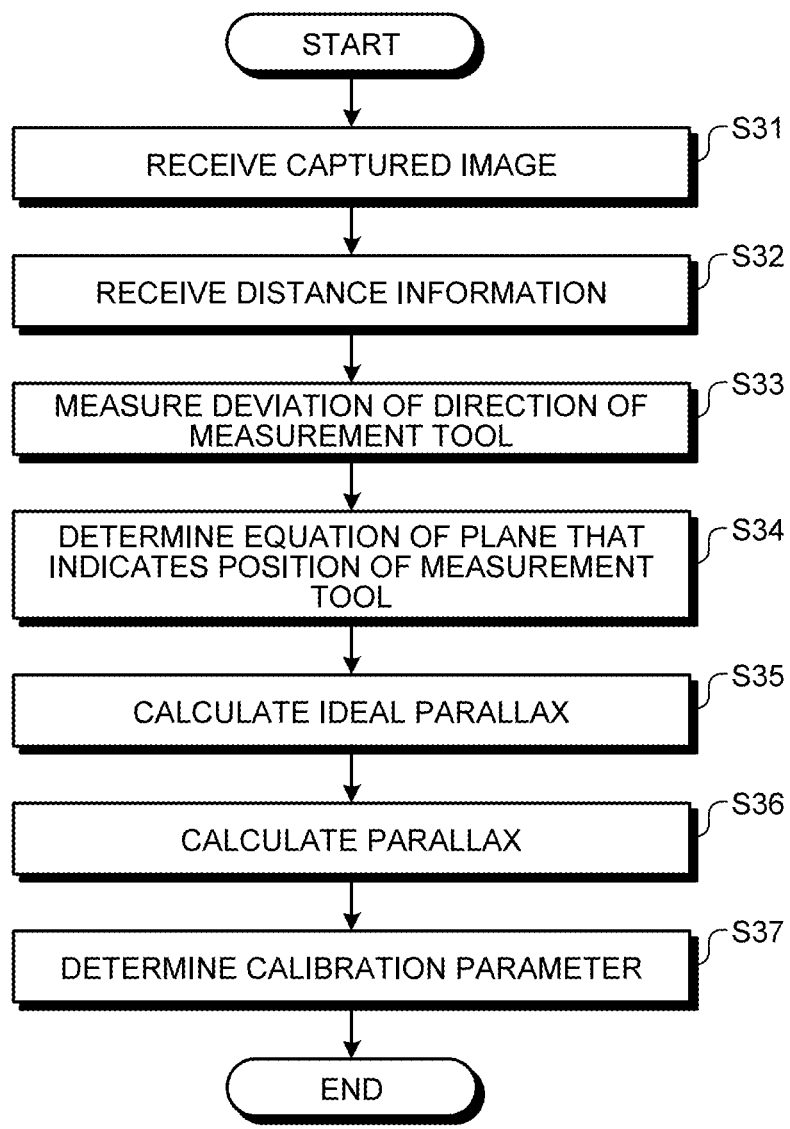
FIG. 25 is a flowchart that illustrates an example of the calibration method for the calibration device according to the second embodiment.

FIG. 25 is a flowchart that illustrates an example of the calibration method for the calibration device 30 according to the second embodiment.

The receiving unit 131 receives the captured image (the first captured image and the second captured image) that includes the measurement tool 120 as an object (Step S31). Furthermore, the receiving unit 131 receives the distance information $d_c$ (Step S32).

Next, the measuring unit 136 measures a deviation of the direction of the measurement tool 120 from the facing position of the stereo camera 10 (Step S33). Specifically, the measuring unit 136 determines a direction (normal vector) that is perpendicular to the surface of the measurement tool 120 (the angle measurement plate 101) by using the method that is illustrated in FIG. 21 on the basis of the position of the maximum brightness in the first captured image, thereby measuring a deviation of the direction of the measurement tool 120.

Next, the measuring unit 136 determines the equation of the plane that indicates the position of the measurement tool 120 in the first-camera coordinate system (the coordinate system in which the optical center $O_0$ of the first camera 1 is an origin) by using the method that is illustrated in FIG. 22 on the basis of the normal vector and the distance information $d_c$ (Step S34).

Next, the ideal-parallax calculating unit 137 uses the method that is illustrated in FIG. 3 to calculate an ideal parallax that indicates the parallax in a case where an image of the plane represented by the equation that is determined at Step S34 is captured (Step S35). Next, the parallax calculating unit 138 uses a shading pattern of the measurement tool 120 (the first member 102), or the like, to detect a corresponding point that is in the second captured image and that corresponds to a point in the first captured image, thereby calculating a parallax (Step S36).

Next, the determining unit 139 determines a calibration parameter for correcting at least one of the first captured image and the second captured image such that the difference between the parallax and the ideal parallax becomes zero (Step S37).

The overall flow of the calibration method according to the second embodiment that uses the above-described measurement tool 120 and the above-described calibration device 30 is the same as that is explained in FIG. 12 according to the first embodiment; therefore, its explanation is omitted.

As described above, with the calibration method according to the second embodiment, a deviation of the direction of the measurement tool 120 from the facing position of the stereo camera 10 is measured on the basis of the position of the maximum brightness of the first captured image. Furthermore, a calibration parameter for calibrating the stereo camera 10 is determined on the basis of the parallax that is calculated from the first captured image and the second captured image and the ideal parallax in which a deviation of the direction of the measurement tool 120 is taken into account. Thus, it is possible to easily calculate a calibration parameter with high accuracy with respect to the stereo camera 10 that is installed in a vehicle for which it is difficult to ensure the installation location accuracy. Furthermore, according to the present embodiment, it is possible to achieve a calibration with higher accuracy by using a simple configuration with respect to the stereo camera 10 that is not installed in a vehicle, or the like. Furthermore, the hole of the angle measurement plate is a circular hole in the present embodiment; however, this is not a limitation. For example, a square hole, or the like, may be used.

Third Embodiment

Next, a third embodiment is explained. In the third embodiment, an explanation is given of a case where a measurement tool 220 (the angle measurement plate 101) is used, which has a different configuration than that of the measurement tool 120 (the angle measurement plate 101) according to the second embodiment. In the explanation of the third embodiment, the point that is different from that of the second embodiment is explained.

Figure 26:
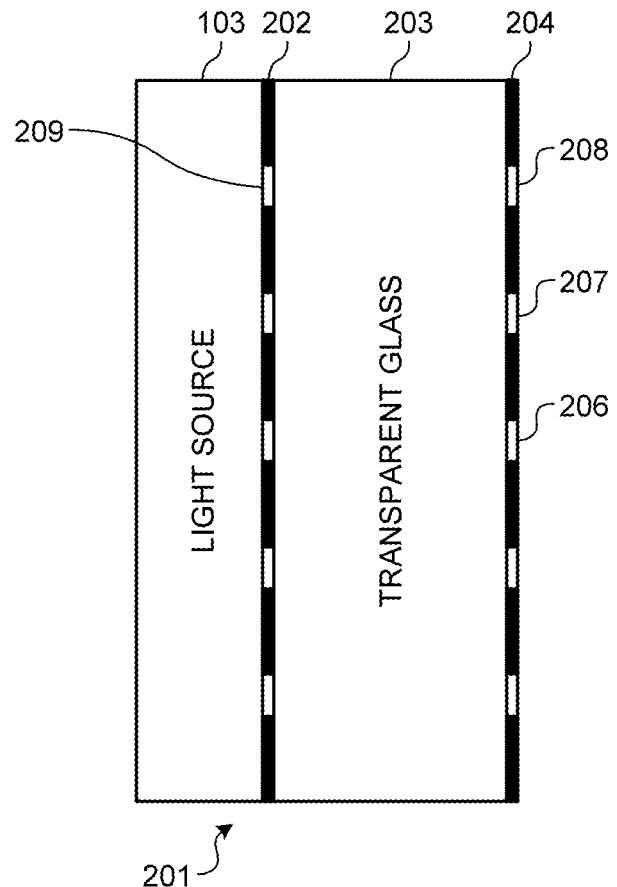
FIG. 26 is a cross-sectional view that illustrates a cross-sectional surface of an angle measurement plate according to a third embodiment.

FIG. 26 is a cross-sectional view that illustrates a cross-sectional surface of an angle measurement plate 201 according to the third embodiment. As the front view of the angle measurement plate 201 is the same as that in FIG. 15B, it is omitted. The angle measurement plate 201 includes the light source 103, a light shielding plate 202, a transparent glass 203, and a light shielding plate 204. As the light source 103 is the same as that in the second embodiment, its explanation is omitted. The light shielding plate 202, the transparent glass 203, and the light shielding plate 204 correspond to the second member 104 according to the second embodiment.

The angle measurement plate 201 according to the third embodiment uses a transparent glass plate that has opaque light shielding areas (the light shielding plate 202 and the light shielding plate 204) arranged on both surfaces thereof. The transparent glass 203 is provided to fix the positions of the light shielding plate 202 and the light shielding plate 204. The gap between the light shielding plate 202 and the light shielding plate 204 is filled with glass; thus, it is possible to have resistance to mechanical displacements and to reduce measurement errors that are caused by a temperature, deformation with time, or the like. The transparent glass 203 may be any transparent object.

The angle measurement plate 201 according to the third embodiment is the same as the angle measurement plate 101 according to the first embodiment in that, because of the holes of the light shielding surfaces on the front and back sides, light that enters in a direction substantially perpendicular to the angle measurement plate 201 is passed and transmitted through the opposing hole (e.g., a hole 208 and a hole 209). However, as light is refracted at the boundary surface between the transparent glass 203 and air, the brightness distribution of the captured image is different from that of the second embodiment.

Figure 27:
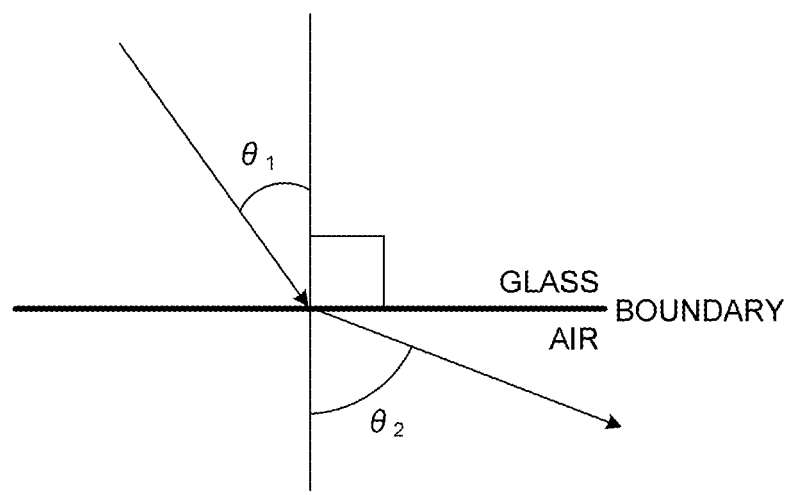
FIG. 27 is a diagram that illustrates the angle at which light is refracted.

FIG. 27 is a diagram that illustrates the angle at which light is refracted. As already known (Snell's law), the direction in which the transmitted light is output is changed due to the refraction on the glass-air boundary surface. If the specific refractive index is R, the relationship between angles θ1 and θ2 of FIG. 27 is the following Equation (11).

$$\frac{\sin(\theta_1)}{\sin(\theta_2)} = R \tag{11}$$

Figure 28:
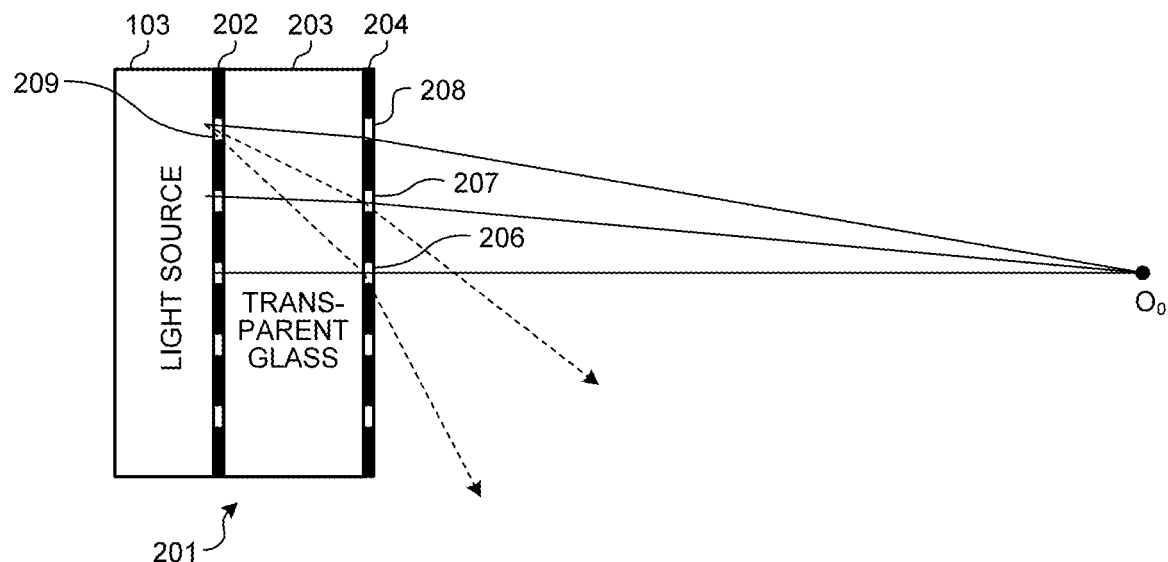
FIG. 28 is a diagram that illustrates light that is emitted through the angle measurement plate according to the third embodiment.

Therefore, if the overall thickness of the light shielding plate 202, the transparent glass 203, and the light shielding plate 204 is the same as that of the second member 104 according to the second embodiment, and so is the diameter of the holes, farther holes can be seen due to the refraction of glass (see FIG. 28). Therefore, the size of the foot of the mountain of the brightness distribution of the captured image is larger than that in the second embodiment. However, the same characteristics are obtained such that the position of the brightness peak corresponds to the normal direction of the light shielding plate 204 regardless of the position of the optical center $O_0$ of the stereo camera 10 (the first camera 1).

Unlike the second member 104 according to the first embodiment, the angle measurement plate 201 according to the third embodiment permits a transmission of light that passes through the hole that does not face it and is located in a direction that is indicated by a dotted line of FIG. 28 other than a front direction. For example, with regard to a hole 207, light through the hole 209 that is opposed to the hole 208 is transmitted through the hole 207 due to the effect of refraction.

Therefore, unlike the case of the second embodiment, a moire pattern where light and dark are periodically repeated is observed from the captured image of the angle measurement plate 201. Therefore, there is a possibility that multiple brightness peaks are present within the image capturing area. However, if the accuracy of the installation angles of the stereo camera 10 (the first camera 1) and the measurement tool 220 is previously determined, it is possible to prevent the position of the brightness peak of the facing hole from being mistaken for the brightness peak that corresponds to an adjacent hole by considering the period of moire that corresponds to the moving range of the position of the brightness peak that is based on the range of an installation deviation.

Figure 29:
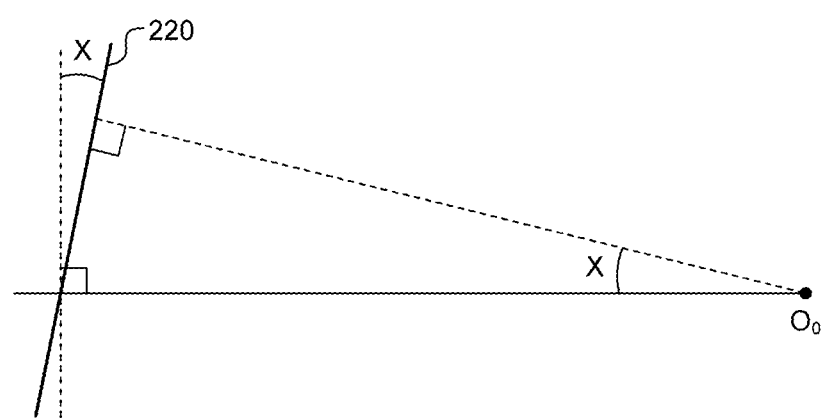
FIG. 29 is a diagram that illustrates the relationship between a tilt of the measurement tool and a deviation of the position of the brightness peak.
Figure 30:
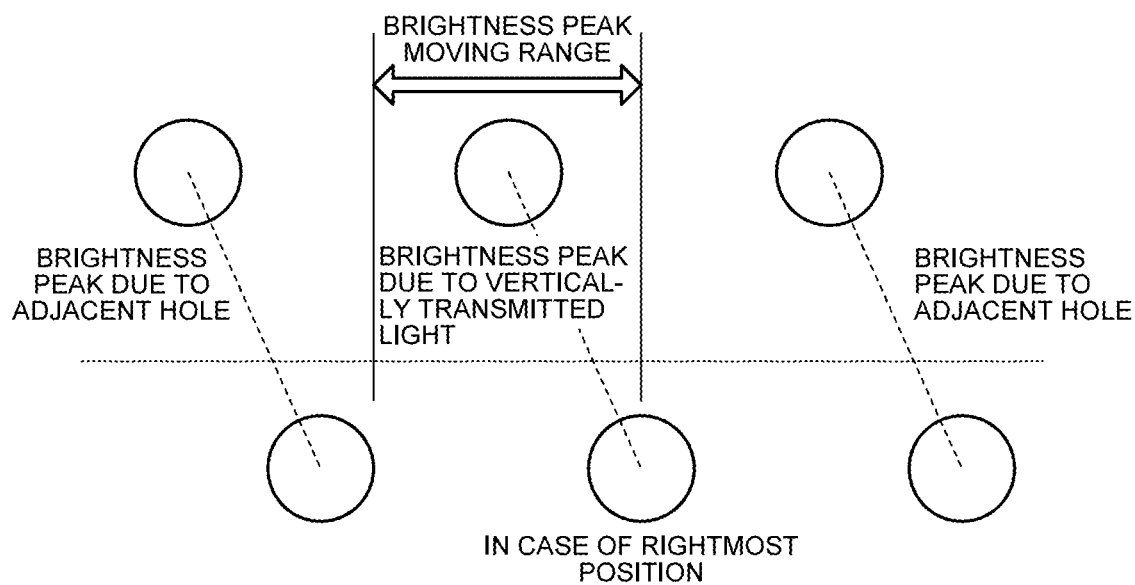
FIG. 30 is a diagram that illustrates the relationship between the period of moire and the moving range of the brightness peak.
Figure 31:
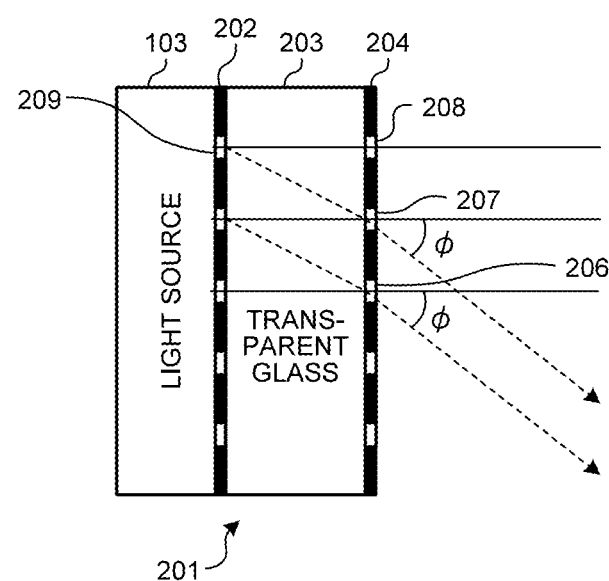
FIG. 31 is a diagram that illustrates the position of the brightness peak due to an adjacent hole.

FIG. 29 is a diagram that illustrates the relationship between a tilt of the measurement tool 220 and a deviation of the position of the brightness peak. As in FIG. 29, if the installation angle of the measurement tool 220 has an angle deviation of equal to or less than ±X degrees from the facing direction, the position of the brightness peak is present in a range of equal to or less than X degrees from the facing position (the center of the screen). Specifically, as in FIG. 30, the interval of holes may be adjusted such that the brightness peak of an adjacent hole is located at a position more than twice as far away as from the expected positional deviation of the brightness peak. The position of the brightness peak of an adjacent hole is determined by using an angle ϕ of FIG. 31 (specifically, f tan (ϕ)), and the angle ϕ has the relationship of the following Equation (12) with a light shielding surface's hole pitch (p), a glass plate thickness (d), and a glass refractive index (n).

$$\frac{\sin(\Phi)}{\sin(\arctan(p/d))} = n \quad (12)$$

According to Equation (12), it is understood that the glass plate thickness (d) and the hole pitch (p) may be determined such that the following Equation (13) is satisfied.

$$\Phi = \arcsin(n \sin(\arctan(p/d))) > 2X \quad (13)$$

In the above-described explanation, only the accuracy of the installation angle is considered to expect the position of the adjacent brightness peak. However, in actuality, it is necessary to expect the range in which the brightness peak indicating the facing position is present by considering every conceivable installation deviations, such as the installation angle of the stereo camera 10, a translational deviation of the measurement tool 220, or a translational deviation of the stereo camera 10 other than the installation angle of the measurement tool 220. Furthermore, the glass plate thickness (d) and the hole pitch (p) are determined such that the brightness peak of an adjacent hole does not fall within the range of the expected brightness peak position; thus, it is possible to uniquely determine the position of the brightness peak within the expected range that corresponds to the hole facing the stereo camera 10.

It is possible to use a technology, such as printing or photo-etching, as a method for forming a light shielding area on a flat plate when the light shielding plate 202 (204) is formed. With these technologies, in general, it is easy to form a hole with a small diameter or a narrow pitch, compared to the second member 104 according to the second embodiment that is formed by using a method of forming a hole in a thick plate with a drill, or the like. The size of the mountain of brightness is determined according to the ratio of the hole diameter to the plate thickness (and the refractive index). For example, if the plate thickness (the overall thickness of the light shielding plate 202, the transparent glass 203, and the light shielding plate 204) is 6 mm and the hole radius is 0.05 mm, substantially the same brightness distribution as that in the case of the second embodiment can be obtained.

As explained above, with regard to the measurement tool 220 according to the third embodiment, even if the angle measurement plate 201 is a more lightweight, smaller, and thinner plate compared to the angle measurement plate 101 according to the second embodiment, it is possible to achieve the equivalent calibration accuracy to that of the angle measurement plate 101 according to the second embodiment.

Furthermore, to simply block light, the light shielding plate 202 and the light shielding plate 204 may be installed at the same positions as the light shielding areas on both sides of glass without installing the transparent glass 203.

Figure 32:
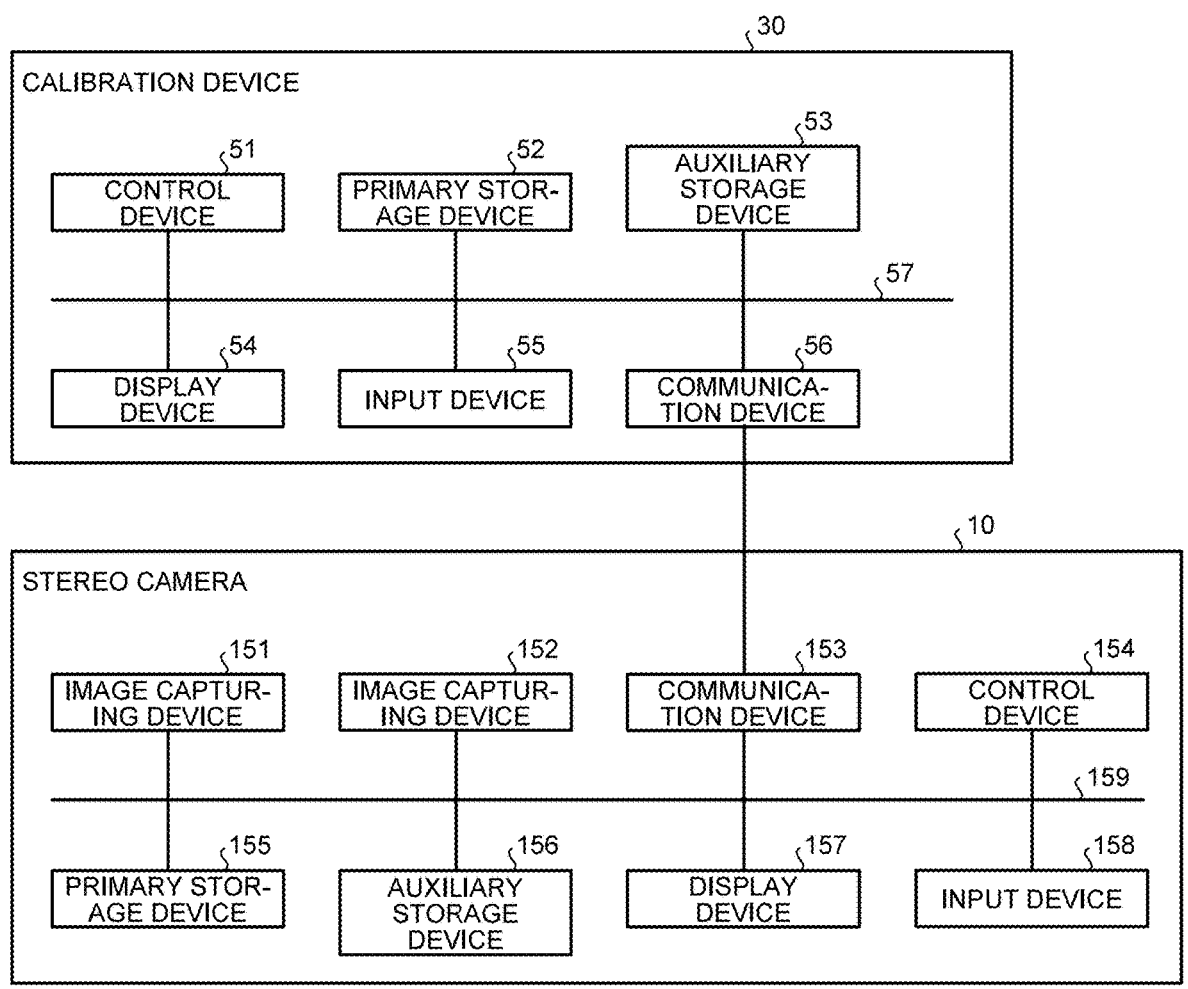
FIG. 32 is a diagram that illustrates an example of the hardware configuration of the stereo camera and the calibration device according to the first to the third embodiments.

Finally, an explanation is given of an example of a hardware configuration of the calibration device 30 according to the first to the third embodiments. FIG. 32 is a diagram that illustrates an example of the hardware configuration of the stereo camera 10 and the calibration device 30 according to the first to the third embodiments.

The calibration device 30 according to the first to the third embodiments includes a control device 51, a primary storage device 52, an auxiliary storage device 53, a display device 54, an input device 55, and a communication device 56. The control device 51, the primary storage device 52, the auxiliary storage device 53, the display device 54, the input device 55, and the communication device 56 are connected to one another via a bus 57.

The stereo camera 10 according to the first to the third embodiments includes an image capturing device 151, an image capturing device 152, a communication device 153, a control device 154, a primary storage device 155, an auxiliary storage device 156, a display device 157, and an input device 158. The image capturing device 151, the image capturing device 152, the communication device 153, the control device 154, the primary storage device 155, the auxiliary storage device 156, the display device 157, and the input device 158 are connected to one another via a bus 159.

The control device 51 (the control device 154) is a CPU. The control device 51 (the control device 154) executes a program that is read from the auxiliary storage device 53 (the auxiliary storage device 156) into the primary storage device 52 (the primary storage device 155). The primary storage device 52 (the primary storage device 155) is a memory, such as a ROM or RAM. The auxiliary storage device 53 (the auxiliary storage device 156) is an HDD (Hard Disk Drive), a memory card, or the like. The display device 54 (the display device 157) displays the state of the calibration device 30 (the stereo camera 10), or the like. The input device 55 (the input device 158) receives an input from a user. The communication device 56 of the calibration device 30 and the communication device 153 of the stereo camera 10 communicate with each other via a wired or wireless network.

The image capturing device 151 corresponds to the first camera 1 (see FIG. 2). The image capturing device 152 corresponds to the second camera 2 (see FIG. 2).

A program that is to be executed by the stereo camera 10 and the calibration device 30 according to the first to the third embodiments is provided as a computer program product by being stored, in the form of a file that is installable and executable, in a recording medium readable by a computer, such as a CD-ROM, a memory card, a CD-R, or a DVD (Digital Versatile Disk).

Furthermore, a configuration may be such that a program that is to be executed by the stereo camera 10 and the calibration device 30 according to the first to the third embodiments is stored in a computer connected via a network such as the Internet and is provided by being downloaded via the network. Moreover, a configuration may be such that a program that is to be executed by the stereo camera 10 and the calibration device 30 according to the first to the third embodiments is provided via a network such as the Internet without being downloaded.

A configuration may be such that a program for the stereo camera 10 and the calibration device 30 according to the first to the third embodiments is provided such that it is installed in a ROM, or the like, in advance.

A program that is to be executed by the calibration device 30 according to the first embodiment has a modular configuration that includes the above-described functional blocks (the receiving unit 31, the first-camera position calculating unit 32, the first-camera direction calculating unit 33, the second-camera position calculating unit 34, the second-camera direction calculating unit 35, the ideal-parallax calculating unit 37, the parallax calculating unit 38, and the determining unit 39). Furthermore, a program that is to be executed by the calibration device 30 according to the second and the third embodiments has a modular configuration that includes the above-described functional blocks (the receiving unit 131, the measuring unit 136, the ideal-parallax calculating unit 137, the parallax calculating unit 138, and the determining unit 139).

Furthermore, a program that is to be executed by the stereo camera 10 according to the first to the third embodiments has a modular configuration that includes the above-described functional blocks (the correcting unit 5 and the calculating unit 6).

With respect to the above-described functional blocks, in terms of actual hardware, the control device 51 (the control device 154) reads the program from the above-described recording medium and executes it so as to load the above-described functional blocks into the primary storage device 52 (the primary storage device 155). That is, the above-described functional blocks are generated in the primary storage device 52 (the primary storage device 155).

Furthermore, all or some of the above-described functional blocks may be implemented by hardware, such as an IC (Integrated Circuit), without being implemented by software.

An embodiment provides an advantage that a high-accuracy calibration parameter for calibrating a stereo camera can be calculated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 FIRST CAMERA
2 SECOND CAMERA
3 STORAGE UNIT
4 EXTERNAL I/F
5 CORRECTING UNIT
6 CALCULATING UNIT
10 STEREO CAMERA
20 MEASUREMENT TOOL
21 MARK
22 DISTANCE MEASUREMENT DEVICE
23 MEASUREMENT POINT
24 LASER BEAM
30 CALIBRATION DEVICE
31 RECEIVING UNIT
32 FIRST-CAMERA POSITION CALCULATING UNIT
33 FIRST-CAMERA DIRECTION CALCULATING UNIT
34 SECOND-CAMERA POSITION CALCULATING UNIT
35 SECOND-CAMERA DIRECTION CALCULATING UNIT
36 DISTANCE CALCULATING UNIT
37 IDEAL-PARALLAX CALCULATING UNIT
38 PARALLAX CALCULATING UNIT
39 DETERMINING UNIT
51 CONTROL DEVICE
52 PRIMARY STORAGE DEVICE
53 AUXILIARY STORAGE DEVICE
54 DISPLAY DEVICE
55 INPUT DEVICE
56 COMMUNICATION DEVICE
57 BUS
101 ANGLE MEASUREMENT PLATE
102 FIRST MEMBER (CHART)
103 LIGHT SOURCE
104 SECOND MEMBER (LIGHT SHIELDING PLATE)
120 MEASUREMENT TOOL
131 RECEIVING UNIT
136 MEASURING UNIT
137 IDEAL-PARALLAX CALCULATING UNIT
138 PARALLAX CALCULATING UNIT
139 DETERMINING UNIT
201 ANGLE MEASUREMENT PLATE
202 LIGHT SHIELDING PLATE
203 TRANSPARENT GLASS
204 LIGHT SHIELDING PLATE
220 MEASUREMENT TOOL

CITATION LIST

Patent Literature

[Patent Literature 1] Japanese Patent No. 4109077

The invention claimed is:
1. A calibration method for calibrating a stereo camera, the calibration method comprising:
capturing, using the stereo camera, an image including an object placed so as to fall within an image capturing area of the stereo camera;

determining a second distance from the object to an intermediate measurement point that is not part of the object and is located between the object and the stereo camera;

determining a third distance from the intermediate measurement point to the stereo camera;

calculating a first distance from the object to the stereo camera using the determined second distance and the determined third distance;

measuring, a deviation of a direction of the object from a facing position of the stereo camera; and determining a calibration parameter for calibrating the stereo camera based on the calculated first distance, the measured deviation, and the captured image.

2. The calibration method according to claim 1, wherein the determining step comprises measuring the second distance from the object to the intermediate measurement point using laser light.

3. The calibration method according to claim 1, wherein the determining step comprises measuring the second distance from the object to the intermediate measurement point using a measuring tape.

4. The calibration method according to claim 1, wherein the step of determining the third distance from the intermediate measurement point to the stereo camera is performed in advance.

5. The calibration method according to claim 1, wherein the stereo camera is mounted inside a movable object, and the object is located outside the movable object.

6. The calibration method according to claim 5, wherein the stereo camera is installed inside a front windshield of a vehicle and the intermediate measurement point is provided on the front windshield of the vehicle.

7. A calibration device for calibrating a stereo camera, the calibration device comprising:

an image capturer configured to capture, using the stereo camera, an image including an object placed so as to fall within an image capturing area of the stereo camera; and processing circuitry configured to determine a second distance from the object to an intermediate measurement point that is not part of the object and is located between the object and the stereo camera, determine a third distance from the intermediate measurement point to the stereo camera;

calculate a first distance from the object to the stereo camera using the determined second distance and the determined third distance, measure a deviation of a direction of the object from a facing position of the stereo camera, and determine a calibration parameter for calibrating the stereo camera based on the calculated first distance, the measured deviation, and the captured image.

8. A non-transitory computer-readable medium storing a program that, when executed by processing circuitry, causes the processing circuitry to calibrate a stereo camera by executing a method comprising:

capturing, with the stereo camera, an image including an object placed so as to fall within an image capturing area of the stereo camera;

determining a second distance from the object to an intermediate measurement point that is not part of the object and is located between the object and the stereo camera;

determining a third distance from the intermediate measurement point to the stereo camera;

calculating a first distance from the object to the stereo camera using the determined second distance and the determined third distance;

measuring a deviation of a direction of the object from a facing position of the stereo camera; and determining a calibration parameter for calibrating the stereo camera based on the calculated first distance, the measured deviation, and the captured image.

9. The calibration method of claim 1, wherein the step of determining the second distance comprises determining a distance from a predetermined point on the object to the intermediate measurement point.

10. A movable body on which the calibration device of claim 7 is mounted.

* * * * *